United States Patent
Takeda et al.

(10) Patent No.: US 11,291,022 B2
(45) Date of Patent: Mar. 29, 2022

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 540 days.

(21) Appl. No.: 16/319,535

(22) PCT Filed: Jul. 24, 2017

(86) PCT No.: PCT/JP2017/026590
§ 371 (c)(1),
(2) Date: Jan. 22, 2019

(87) PCT Pub. No.: WO2018/021203
PCT Pub. Date: Feb. 1, 2018

(65) Prior Publication Data
US 2021/0282162 A1    Sep. 9, 2021

(30) Foreign Application Priority Data
Jul. 26, 2016   (JP) .............................. JP2016-146464

(51) Int. Cl.
*H04W 24/10*        (2009.01)
*H04W 72/12*        (2009.01)
(Continued)

(52) U.S. Cl.
CPC ......... *H04W 72/1226* (2013.01); *H04W 8/24* (2013.01); *H04W 24/10* (2013.01);
(Continued)

(58) Field of Classification Search
CPC ......... H04W 72/1226; H04W 72/0446; H04W 72/1289; H04W 8/24; H04W 72/14; H04W 24/10
See application file for complete search history.

(56) References Cited

U.S. PATENT DOCUMENTS

2014/0010126 A1* 1/2014 Sayana ................ H04B 7/0619
                                                  370/280
2014/0078919 A1* 3/2014 Hammarwall ........ H04L 1/0026
                                                  370/252
(Continued)

FOREIGN PATENT DOCUMENTS

JP      2013-541297 A    11/2013
WO  WO-2012047842 A1 *  4/2012  ............ H04W 24/10
(Continued)

OTHER PUBLICATIONS

Office Action issued in Russian Application No. 2019103077/07; dated Sep. 21, 2020 (13 pages).
(Continued)

*Primary Examiner* — Lan-Huong Truong
(74) *Attorney, Agent, or Firm* — Osha Bergman Watanabe & Burton LLP

(57) ABSTRACT

The present invention is designed to support appropriate CSI measurements and reporting even when shortened TTIs and/or processing time reduction are introduced. A user terminal according to one aspect of the present invention communicates in a cell, which uses a shortened transmission time interval (TTI) that has a shorter TTI duration than 1 ms and/or in a cell in which communication is controlled by applying shortened processing time that is shorter than processing time in an existing LTE system, and this user terminal has a measurement section that measures channel state information (CSI) by using a CSI reference resource, and a transmission section that transmits the CSI in a given
(Continued)

subframe, and the CSI reference resource is found in a subframe that is located a period before the given subframe, the period being shorter than a given time period.

4 Claims, 18 Drawing Sheets

(51) Int. Cl.
  *H04W 8/24* (2009.01)
  *H04W 72/04* (2009.01)
  *H04W 72/14* (2009.01)
(52) U.S. Cl.
  CPC ... *H04W 72/0446* (2013.01); *H04W 72/1289* (2013.01); *H04W 72/14* (2013.01)

(56) References Cited

U.S. PATENT DOCUMENTS

| | | |
|---|---|---|
| 2015/0180634 A1 | 6/2015 | Hoshino et al. |
| 2018/0063736 A1 | 3/2018 | Sadeghi et al. |

FOREIGN PATENT DOCUMENTS

| | | |
|---|---|---|
| WO | 2014/020828 A1 | 2/2014 |
| WO | 2016/077701 A1 | 5/2016 |

OTHER PUBLICATIONS

Office Action in counterpart European Patent Application No. 17834209.3 dated Jun. 22, 2020 (6 pages).
International Search Report issued in PCT/JP2017/026590 dated Oct. 10, 2017 (2 Pages).
Written Opinion of the International Searching Authority issued in PCT/JP2017/026590 dated Oct. 10, 2017 (4 Pages).
Lenovo; "Frame structure design for next radio interface"; 3GPP TSG RAN WG1 Meeting #84bis, R1-162742; Busan, Korea, Apr. 11-15, 2016 (3 Pages).
Huawei, HiSilicon; "Discussion on CSI feedback for short TTI"; 3GPP TSG RAN WG1 Meeting #85, R1-164065 Nanjing, China, May 23-27, 2016 (3 Pages).
NTT Docomo, Inc.; "Views on processing time reduction and related procedures"; 3GPP TSG RAN WG1 Meeting #85, R1-165214; Nanjing, P.R. China, May 23-27, 2016 (3 Pages).
3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network(E-UTRAN); Overall description; Stage 2 (Release 12)"; Dec. 2014 (251 Pages).
Extended European Search Report issued in counterpart European Patent Application No. 17834209.3, dated Nov. 11, 2019 (9 pages).
Office Action issued in Chinese Application No. 201780044767.6 dated Oct. 28, 2021 (14 pages).
Notice of Reasons for Refusal for Japanese Patent Application No. 2018-529859 dated Oct. 26, 2021 (4 pages).

* cited by examiner

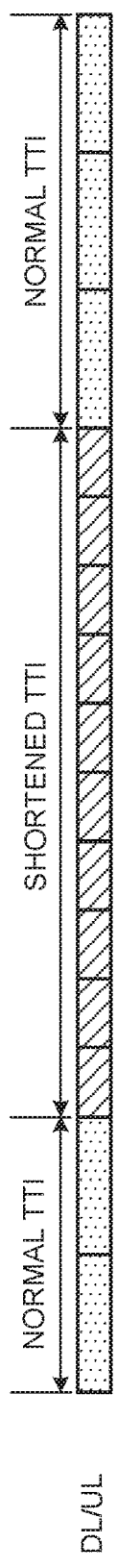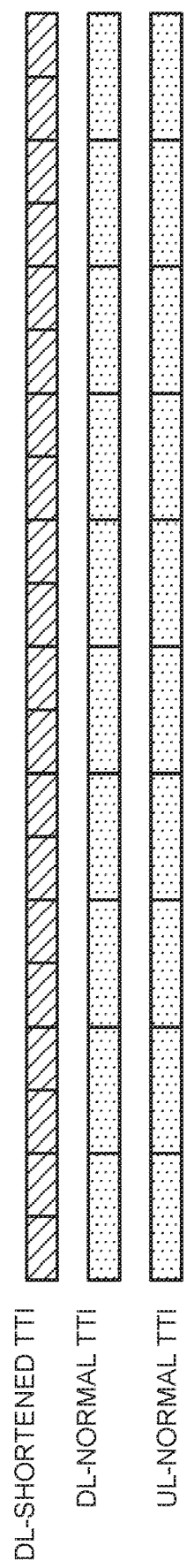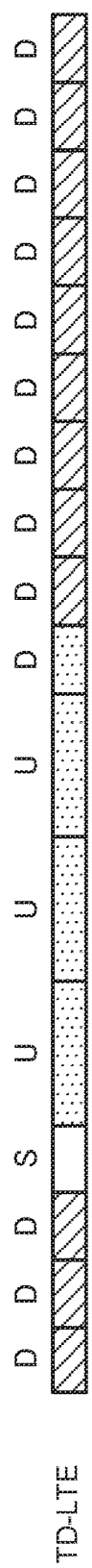
FIG. 4A
FIG. 4B
FIG. 4C

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). Also, the specifications of LTE-A (also referred to as "LTE-advanced," "LTE Rel. 10," "LTE Rel. 11" or "LTE Rel. 12") have been drafted for further broadbandization and increased speed beyond LTE (also referred to as "LTE Rel. 8" or "LTE Rel. 9"), and successor systems of LTE (also referred to as, for example, "FRA (Future Radio Access)," "5G (5th generation mobile communication system)," "NR (New Radio)," "NX (New radio access)," "FX (Future generation radio access)," "LTE Rel. 13," "LTE Rel. 14," "LTE Rel. 15" and/or later versions) are under study.

In LTE Rel. 10/11, carrier aggregation (CA) to integrate multiple component carriers (CC) is introduced in order to achieve broadbandization. Each CC is configured with the system bandwidth of LTE Rel. 8 as one unit. In addition, in CA, multiple CCs under the same radio base station (eNB (eNodeB)) are configured in a user terminal (UE (User Equipment)).

Meanwhile, in LTE Rel. 12, dual connectivity (DC), in which multiple cell groups (CGs) formed by different radio base stations are configured in UE, is also introduced. Each cell group is comprised of at least one cell (CC). In DC, since multiple CCs of different radio base stations are integrated, DC is also referred to as "inter-eNB CA."

When CA is used, a primary cell (PCell), which is a cell of high reliability that ensures connectivity, and a secondary cell (SCell), which is an adjunct cell, are configured in UE. UE can first connect to the PCell, and then SCells can be added if necessary. The PCell is in effect a single cell (standalone cell) that supports RLM (Radio Link Monitoring), SPS (Semi-Persistent Scheduling) and so on. SCells are cells that are configured in UE in addition to the PCell.

In existing LTE systems (for example, LTE Rel. 8 to 12), uplink signals are mapped to appropriate radio resources and transmitted from UE to eNB. Uplink user data is transmitted using an uplink shared channel (PUSCH (Physical Uplink Shared CHannel)). Also, uplink control information (UCI (Uplink Control Information)) is transmitted using a PUSCH when transmitted with uplink user data, and transmitted using an uplink control channel (PUCCH (Physical Uplink Control CHannel)) when transmitted alone.

The UCI includes delivery acknowledgment information (ACK/NACK) in response to a downlink shared channel (PDSCH (Physical Downlink Shared CHannel)), a scheduling request, channel state information (CSI (Channel State Information)) and so forth. The delivery acknowledgment information may be referred to as "HARQ-ACK (Hybrid Automatic Repeat reQuest Acknowledgment)," "ACK/NACK (A/N)," "retransmission control information," and so on.

CSI refers to information that is based on instantaneous downlink channel states, and includes, for example, a channel quality indicator (CQI), a precoding matrix indicator (PMI), a precoding type indicator (PTI), a rank indicator (RI) and/or others. CSI is reported from UE to eNB periodically or aperiodically.

Periodic CSI (P-CSI) refers to the kind of CSI that is periodically transmitted from UE based on the period and resources reported from the radio base station. On the other hand, aperiodic CSI (A-CSI) refers to the kind of CSI that is transmitted from UE in response to a CSI reporting request (also referred to as a "trigger," "CSI trigger," "CSI request," etc.) from the radio base station.

A CSI trigger is included in an uplink scheduling grant (hereinafter also referred to as a "UL (UpLink) grant") transmitted in a downlink control channel (PDCCH (Physical Downlink Control CHannel)). Following the CSI trigger contained in this UL grant, UE reports A-CSI by using the PUSCH specified by this UL grant. Such reporting is also referred to as "A-CSI reporting."

In existing systems (LTE Rel. 8 to 12), frequency division duplex (FDD), in which downlink (DL) transmission and uplink (UL) transmission take place in different frequency bands, and time division duplex (TDD), in which DL transmission and UL transmission are switched over time so as to take place in the same frequency band, are introduced.

Also, in existing systems, the transmission time interval (TTI) that is applied to transmission/receipt at eNB and UE is configured to 1 ms (millisecond) and controlled accordingly. This transmission time interval is also referred to as a "communication time interval," and a TTI in LTE systems (Rel. 8 to 12) is also referred to as a "subframe duration."

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

Future radio communication systems (for example, 5G, NR, etc.) are anticipated to realize various radio communication services so as to fulfill mutually varying requirements (for example, ultra-high speed, large capacity, ultra-low latency, etc.).

For example, 5G is under research to provide radio communication services referred to as "eMBB (enhanced Mobile Broad Band)," "IoT (Internet of Things)," "MTC (Machine Type Communication)," "M2M (Machine To Machine)," "URLLC (Ultra Reliable and Low Latency Communications)," and so on. Note that, depending on the communicating device, M2M may be referred to as "D2D (Device To Device)," "V2V (Vehicle To Vehicle)," and/or the like. To fulfill the requirements for the above-mentioned various kinds of communication, studies are going on to design a new communication access scheme (new RAT (Radio Access Technology)).

Reduction of communication delay (latency reduction) is under research in order to provide sufficient communication services in such future radio communication systems. For example, a study is in progress to make the transmission time interval (TTI) that serves as the minimum time unit in scheduling shorter than 1 ms, which is the case in existing LTE systems (LTE Rel. 8 to 12), and communicate by using these TTIs (which may be referred to as, for example, "shortened TTIs"). Alternatively, research is underway to shorten the processing time (processing time reduction) by applying short processing time compared to existing LTE systems.

However, in existing LTE systems, the timing of communication is controlled in units of subframes (in 1-ms units), and how to control communication when shortened TTIs and/or processing time reduction are introduced is still undecided.

For example, as described above, in existing LTE systems, operations for reporting periodic channel state information (P-CSI) and aperiodic channel state information (A-CSI) are stipulated. When shortened TTIs and/or processing time reduction are introduced, the problem is how to control transmission and receipt of P-CSI and A-CSI. Thus, there is a demand for a control method, whereby, even when communication is made based on shortened TTIs and/or reduced processing time, communication can still be carried out adequately. Unless UE, eNB and/or others support adequate control methods, problems such as deterioration in communication quality, communication throughput, spectral efficiency and others might surface.

The present invention has been made in view of the above, and it is therefore an object of the present invention to provide a user terminal and a radio communication method that can support appropriate CSI measurements and reporting even when shortened TTIs and/or processing time reduction are introduced.

Solution to Problem

A user terminal, according to one aspect of the present invention, communicates in a cell, which uses a shortened transmission time interval (TTI) that has a shorter TTI duration than 1 ms and/or in a cell in which communication is controlled by applying shortened processing time that is shorter than processing time in an existing LTE system, and this user terminal has a measurement section that measures channel state information (CSI) by using a CSI reference resource, and a transmission section that transmits the CSI in a given subframe, and the CSI reference resource is found in a subframe that is located a period before the given subframe, the period being shorter than a given time period.

Advantageous Effects of Invention

According to the present invention, it is possible to support appropriate CSI measurements and reporting even when shortened TTIs and/or processing time reduction are introduced.

BRIEF DESCRIPTION OF DRAWINGS

FIG. 4A is a diagram to show a first example of the setting of sTTIs, FIG. 4B is a diagram to show a second example of the setting of sTTIs, and FIG. 4C is a diagram to show a third example of the setting of sTTIs;

DESCRIPTION OF EMBODIMENTS

Reduction of Latency in Communication

Figure 1:
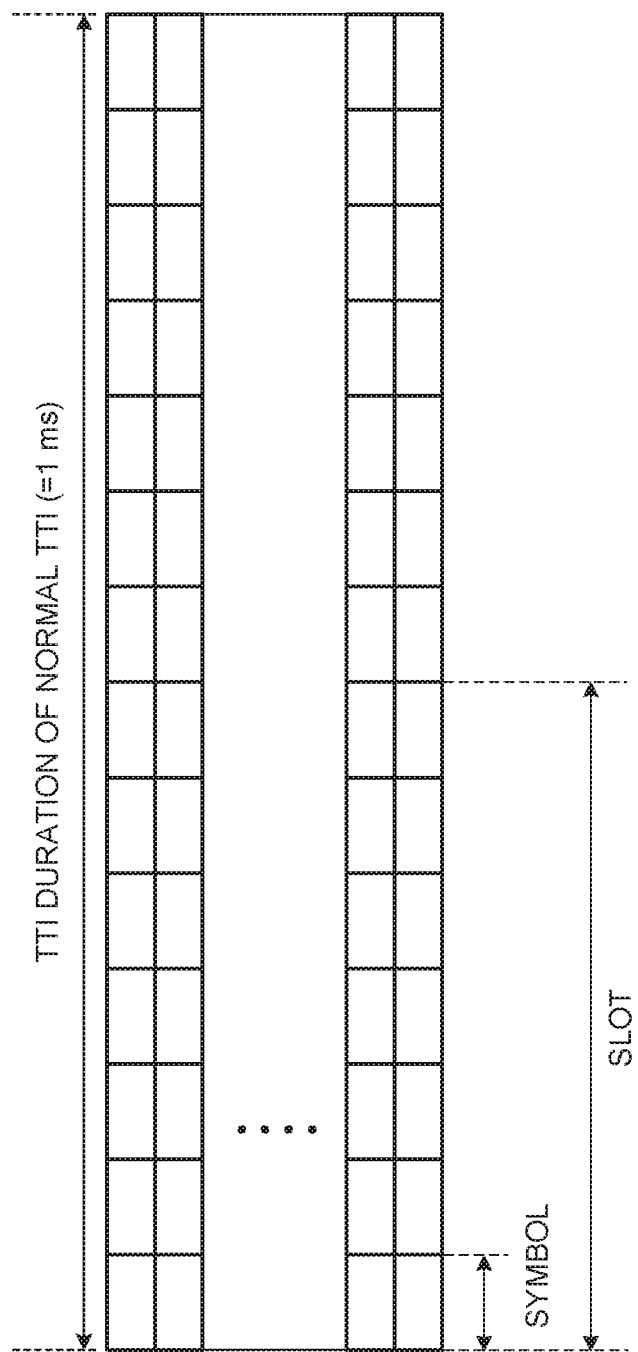
FIG. 1 is a diagram to show an example of an sTTI.

As mentioned earlier, future radio communication systems are expected to reduce latency in communication, and a study is in progress to shorten the processing time for signal transmission/receipt compared to existing LTE systems. As for the method of enabling reduction of processing time, communication may be controlled on a per subframe basis as in existing LTE systems, and, apart from this, it may be possible to configure the processing time shorter than the processing time in existing LTE systems.

Here, the processing time (for example, the processing time in LTE Rel. 8 to 12) in existing LTE systems may be referred to as "normal processing time." Processing time shorter than the normal processing time may be referred to as "shortened processing time." UE where shortened processing time is configured controls the transmitting/receiving processes of predetermined signals (for example, encoding), so that these signals are transmitted/received at earlier timings than the transmission/receiving timings defined in existing LTE systems. Shortened processing time may be configured for specific processes (may be configured in various units, such as per signal, per process, etc.), or configured for all processes.

For example, when UE of existing systems receives a UL grant in subframe n, the UE transmits UL data in a subframe that comes a predetermined period of time later (for example, subframe n+k (where k is four or greater)). By contrast with this, when processing time reduction is configured, the UE exerts control so that UL data is transmitted at timings that come earlier than subframe n+k (for example, in subframe n+k' (where k' is less than four)). In this case, even when communication is controlled in units of subframes, as has been done heretofore, it is still possible to shorten the time required to transmit UL data.

Note that the shortened processing time may be defined in advance in the specification, or may be reported (configured, commanded, etc.) to the UE through higher layer signaling (for example, broadcast information, RRC (Radio Resource Control) signaling, etc.) and/or physical layer signaling (for example, downlink control information (DCI)).

Also, as for the method of achieving reduced latency in communication, it may be possible to introduce shortened TTIs having shorter durations than a subframe (1 ms) of existing LTE systems, and control transmission and receipt of signals. Here, a TTI having a time duration of 1 ms like an existing subframe (for example, a TTI in LTE Rel. 8 to 12) may be referred to as a "normal TTI (nTTI)." A TTI that is shorter than an nTTI may be referred to as a "shortened TTI (sTTI)."

When sTTIs are used, the time margin for processing (for example, encoding, decoding, etc.) in UE and/or eNB grows, so that the processing latency can be reduced. Also, when sTTIs are used, it is possible to increase the number of UEs that can be accommodated per unit time (for example, 1 ms). Now, sTTIs will be described below with reference to FIG. 1 to FIG. 4.

FIG. 1 is a diagram to explain an example of transmission time intervals (TTIs) in existing systems (LTE Rel. 8 to 12). As shown in FIG. 1, an nTTI is 1 ms long in time. An nTTI is also referred to as a "subframe," and is comprised of two time slots. A TTI is one channel-coded data packet (transport block) transmission time unit, and is the processing unit in scheduling, link adaptation, etc.

As shown in FIG. 1, when a normal cyclic prefix (CP) is used in the downlink (DL), an nTTI is comprised of 14 OFDM (Orthogonal Frequency Division Multiplexing) symbols (seven OFDM symbols per slot). Each OFDM symbol has a time duration (symbol duration) of 66.7 μs, and a normal CP of 4.76 μs is appended. Since the symbol duration and the subcarrier spacing are reciprocal to each other, the subcarrier spacing is 15 kHz when the symbol duration is 66.7 μs.

Also, when normal a cyclic prefix (CP) is used in the uplink (UL), an nTTI is configured to include 14 SC-FDMA (Single Carrier Frequency Division Multiple Access) symbols (seven SC-FDMA symbols per slot). Each SC-FDMA symbol has a time duration (symbol duration) of 66.7 μs, and a normal CP of 4.76 μs is appended. Since the symbol duration and the subcarrier spacing are reciprocal to each other, the subcarrier spacing is 15 kHz when the symbol duration is 66.7 μs.

Incidentally, when an extended CP is used, an nTTI may be comprised of 12 OFDM symbols (or 12 SC-FDMA symbols). In this case, each OFDM symbol (or each SC-FDMA symbol) has a time duration of 66.7 μs, and an extended CP of 16.67 μs is appended.

Figure 2:
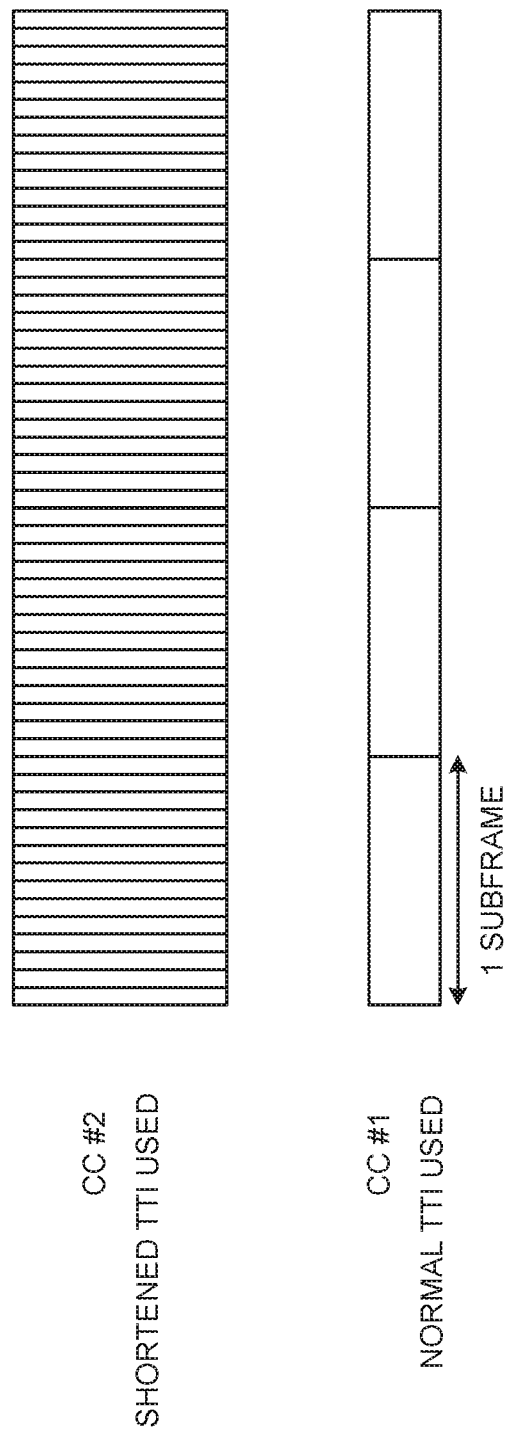
FIG. 2 shows example cases of communicating using nTTIs and sTTIs.

FIG. 2 shows an example case of communicating using nTTIs and sTTIs. FIG. 2 shows a cell (CC #1) to use nTTIs (1 ms) and a cell (CC #2) to use sTTIs. When sTTIs are used, it may be possible to make the subcarrier spacing different from that of nTTI subcarriers. Referring to FIG. 2, the subcarrier spacing in CC #2 is expanded compared to CC #1, and a wider bandwidth is used.

Examples of Configurations of Shortened TTIs

Figure 3A:
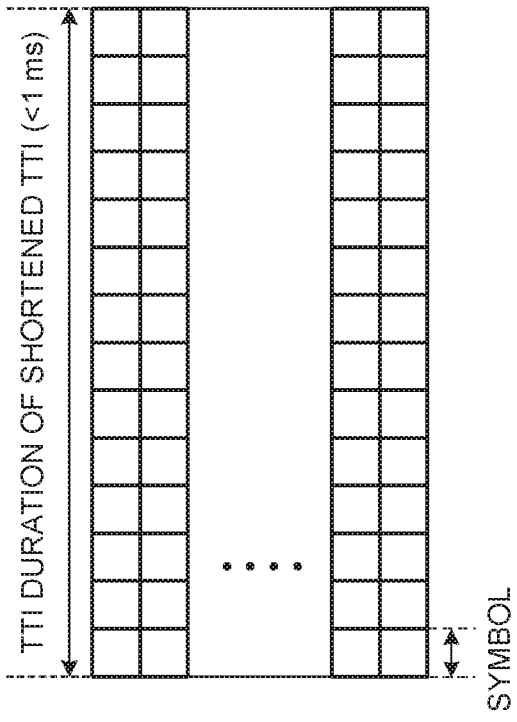
FIG. 3A is a diagram to show an example of the configuration of sTTIs.
Figure 3B:
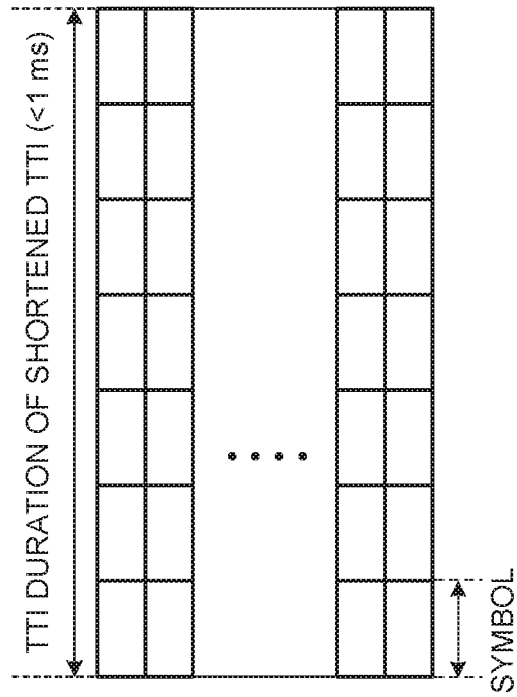
FIG. 3B is a diagram to show another example of the configuration of sTTIs.

FIG. 3 provide diagram to show examples of configurations of sTTIs. FIG. 3A is a diagram to show an example of the configuration of sTTIs, and FIG. 3B is a diagram to show another example of the configuration of sTTIs. As shown in FIGS. 3A and 3B, sTTIs have time durations (TTI durations) shorter than 1 ms. An sTTI may be comprised of one TTI duration or multiple TTI durations that, if multiplied, become 1 ms, such as 0.5 ms, 0.25 ms, 0.2 ms, 0.1 ms and so on.

Alternatively, given that an nTTI for normal CPs contains 14 symbols, an STTI may be comprised of one TTI duration or multiple TTI durations that are integral multiples of $1/14$ ms, such as $7/14$ ms, $4/14$ ms, $3/14$ ms, $2/14$ ms, $1/14$ ms and so on.

Also, given that an nTTI for extended CPs contains 12 symbols, an sTTI may be comprised of one TTI duration or multiple TTI durations that are integral multiples of $1/12$ ms, such as $6/12$ ms, $4/12$ ms, $3/12$ ms, $2/12$ ms, $1/12$ ms and so on.

Note that an sTTI has only to have a shorter time duration than an nTTI, and is not limited to the above-mentioned TTI durations. Also in sTTIs, as in conventional LTE, whether to use normal CPs or use extended CPs can be configured by using higher layer signaling such as broadcast information and RRC signaling. By this means, it is possible to introduce sTTIs, while maintaining compatibility (synchronization) with 1-ms nTTIs.

Note that, although FIGS. 3A and 3B illustrate example cases of using normal CPs, the present invention is not limited to these. The number of symbols in an sTTI, the symbol duration, the CP duration and/or others may be configured freely. Also, although examples will be described below in which OFDM symbols are used in the DL and SC-FDMA symbols are used in the UL, the present invention is not limited to these. For example, different access schemes from OFDM or SC-FDMA may be assigned (configured) to sTTIs.

FIG. 3A is a diagram to show a first example of the configuration of sTTIs. As shown in FIG. 3A, in the first example of configuration, an sTTI is comprised of 14 OFDM symbols (or SC-FDMA symbols), which is equal in number to an nTTI, and each OFDM symbol (each SC-FDMA symbol) has a symbol duration that is shorter than the symbol duration (=66.7 μs) in an nTTI.

As shown in FIG. 3A, when maintaining the number of symbols in an nTTI and shorten the duration of symbols, it is possible to appropriate the physical layer signal configuration of nTTIs (such as mapping to resource elements). In addition, when maintaining the number of symbols in an nTTI, it is possible to place the same amount of information (the same amount of bits) in an sTTI, as in an nTTI.

Also, since the symbol duration and the subcarrier spacing are each the reciprocal of the other, when the symbol duration is shortened as shown in FIG. 3A, the subcarrier spacing becomes wider than the 15-kHz subcarrier spacing for nTTIs. When the subcarrier spacing becomes wider, it is possible to effectively prevent the inter-channel interference that is produced from the Doppler shift when UE moves, and the deterioration of communication quality due to the phase noise in UE's receiver. In particular, in high frequency bands such as several tens of GHz, deterioration of communication quality can be effectively prevented by expanding the subcarrier spacing.

FIG. 3B is a diagram to show a second example of the configuration of sTTIs. As shown in FIG. 3B, according to the second example of configuration, an sTTI is comprised of a smaller number of OFDM symbols (or SC-FDMA symbols) than an nTTI, and each OFDM symbol (each SC-FDMA symbol) has the same symbol duration as an nTTI (=66.7 μs). In this case, the sTTI can be formed with the symbol units of the nTTI (that is, can be formed with a reduced number of symbols). For example, the sTTI can be formed by using part of the 14 symbols contained in one subframe. In FIG. 3B, an sTTI is comprised of seven OFDM symbols (SC-FDMA symbols), which is half of an nTTI.

As shown in FIG. 3B, when the symbol duration is maintained and the number of symbols is reduced, the amount of information (the amount of bits) to be included in an sTTI can be reduced lower than an nTTI. Consequently, UE can perform receiving processes (for example, demodulation, decoding, etc.) for the information contained in an sTTI in a shorter time than an nTTI, so that the processing latency can be shortened. Moreover, by making the symbol duration the same as in existing systems, sTTI signals and nTTI signals can be frequency-multiplexed in the same system band (or carrier, cell, CC, etc.), so that compatibility with nTTIs can be maintained.

For example, when frame configuration type 1 (FDD) is applied, a downlink control channel (also referred to as "sPDCCH," for example) and/or a downlink shared channel (also referred to as "sPDSCH," for example) may be transmitted using sTTIs for existing systems comprised of two symbols and/or one slot.

Also, in frame configuration type 1 (FDD), an uplink control channel (also referred to as "sPUCCH," for example) and/or an uplink shared channel (also referred to as "sPUSCH," for example) can be transmitted using sTTIs comprised of at least one of two symbols, four symbols and one slot.

Alternatively, when frame configuration type 2 (TDD) is used, it is possible to transmit at least one of sPDCCH, sPDSCH, sPUCCH and sPUSCH by using sTTIs comprised of one slot.

Examples of Configurations of Shortened TTIs

Now, example of configurations of sTTIs will be described. When sTTIs are used, it is also possible to configure both nTTIs and sTTIs in UE so as to reserve compatibility with existing systems (LTE Rel. 8 to 12).

FIG. 4 show examples of configurations of nTTIs and sTTIs. Note that FIG. 4 only show examples, and these are by no means limiting. For example, the number and positions of subframes in which sTTIs are configured are not limited to those shown in FIG. 4A.

FIG. 4A is a diagram to show the first example of the configuration of sTTIs. As shown in FIG. 4A, nTTIs and sTTIs may coexist in time, in the same frequency field (for example, in the same component carrier (CC)). To be more specific, sTTIs may be configured in a specific subframe (or a specific radio frame) of the same CC. For example, in FIG. 4A, an sTTI is configured in five consecutive subframes in the same CC, and nTTIs are configured in the other subframes.

The above specific subframes may be subframes that can be configured as MBSFN (Multicast Broadcast Single Frequency Network) subframes, or may be subframes that contain or do not contain certain signals (for example, the master information block (MIB), synchronization signals, etc.).

FIG. 4B is a diagram to show a second example of the configuration of sTTIs. As shown in FIG. 4B, carrier aggregation (CA) or dual connectivity (DC) may be performed by integrating CCs with nTTIs and CCs with sTTIs. To be more specific, sTTIs may be configured in specific CCs (to be more specific, in the DL and/or the UL of specific CCs). For example, in FIG. 4B, sTTIs are configured in the DL of a particular CC, while nTTIs are configured in the DL and the UL of other CCs.

Also, when CA is executed, sTTIs may be configured in specific CCs (PCell and/or SCell) of the same radio base station. On the other hand, when DC is executed, sTTIs may be configured in specific CCs (PCell and/or SCell) in the master cell group (MCG) formed by the first radio base station (MeNB (Master eNB)), or may be configured in specific CCs (primary secondary cell (PSCell) and/or SCell) in a secondary cell group (SCG) formed by a second radio base station (SeNB (Secondary eNB)).

FIG. 4C is a diagram to show a third example of the configuration of sTTIs. As shown in FIG. 4C, sTTIs may be configured in either the DL or the UL. For example, FIG. 4C shows a case in which, in a TDD carrier, nTTIs are configured in the UL and sTTIs are configured in the DL.

Also, specific DL and/or UL channels or signals may be allocated (configured) in sTTIs. For example, a configuration may be employed in which PUCCH is allocated to nTTIs and PUSCH is allocated to sTTIs. In this case, UE can transmit PUCCH in nTTIs and PUSCH in sTTIs.

Method of Determining CSI Reference Resources

Now, in existing LTE systems, what resources can be used to measure CSI is defined. These resources are also referred to as "CSI reference resources," "reference resources," and so on. Hereinafter, CSI reference resource will be also simply referred to as "CSI RRs."

The frequency field for CSI RRs for a predetermined serving cell is defined to be a group of downlink physical resource blocks (PRBs), from which CQI values that correspond to related bands are derived.

Also, the time field for CSI RRs for a predetermined serving cell is defined to be a single downlink subframe or special subframe that is located a predetermined number ($n_{CQI\_ref}$) of subframes before subframe n in which CSI is reported (that is, the subframe of n-$n_{CQI\_ref}$).

When P-CSI is reported in subframe n, $n_{CQI\_ref}$ assumes the minimum value that is greater than or equal to four so that the subframe of n-$n_{CQI\_ref}$ corresponds to a valid downlink subframe or special subframe. In this case, the subframe in which CSI is measured is the nearest subframe that is located four subframes (4 ms) or more before the subframe for reporting the CSI and that fulfills predetermined conditions. Note that, the "valid downlink subframe or special subframe" may be a subframe to fulfill the conditions stipulated in predetermined specifications (for example, 3GPP TS 36.213).

When a CSI trigger is received in a DCI format for the uplink (UL grant) and A-CSI is reported in subframe n, $n_{CQI\_ref}$ has such a value that the CSI RR is found in the valid downlink subframe or special subframe in which this CSI trigger is received. Here, in existing LTE systems, UE transmits the A-CSI based on the UL grant, k subframes after the subframe in which the UL grant containing the CSI trigger is received. k is determined depending on the frame configuration (FDD/TDD) and so on, and, in existing systems, k is a value greater than or equal to four. That is, in this case, again, $n_{CQI\_ref}$ has a value greater than or equal to four.

When a CSI trigger is received in a random access response grant that commands receipt of a random access response, and A-CSI is reported in subframe n, $n_{CQI\_ref}$ is four, and the subframe of n-$n_{CQI\_ref}$, which corresponds to a valid downlink subframe or special subframe, is received after the subframe in which the random access response grant is received.

Although other methods of determining CSI RRs have been provided, in general LTE terminals, CSI RRs are determined based on the above-noted provisions. Note that eNB may limit the subframe set in which CSI measurements can take place (CSI measurement restriction). In addition, eNB may report information related to CSI RRs to UE by using higher layer signaling (for example, RRC signaling), physical layer signaling (for example, DCI) or a combination of these. The information related to CSI RRs may be, for example, a subframe index, information about the subframe set (such as bitmap), the location of radio resources, and so on.

Figure 5:
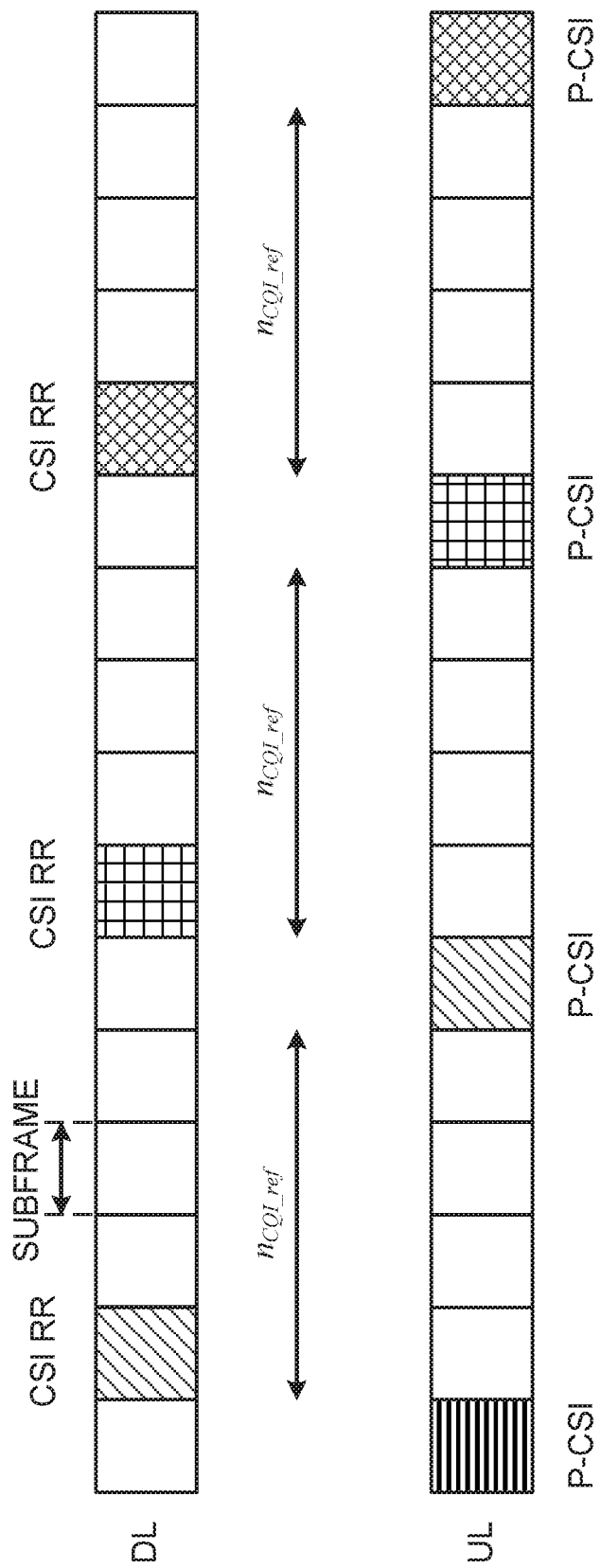
FIG. 5 is a diagram to show examples of CSI reference resources for use for P-CSI reporting in existing systems.

Specific examples of CSI RRs will be described below with reference to FIG. 5 and FIG. 6. FIG. 5 is a diagram to show examples of CSI reference resources for use for P-CSI reporting in existing systems. FIG. 5 shows a DL carrier and a UL carrier. Note that FIG. 6 to FIG. 12 will also later show the same diagram as FIG. 5. Furthermore, although FIG. 5 to FIG. 12 each show two carriers for ease of explanation, configurations to transmit and receive the DL and the UL on one carrier can be used as well.

In FIG. 5, UE reports P-CSI in the UL periodically (in this example, every five subframes). In FIG. 5, subframes that are located four subframes before each P-CSI-reporting subframe are valid subframes, and contain CSI RRs.

Figure 6:
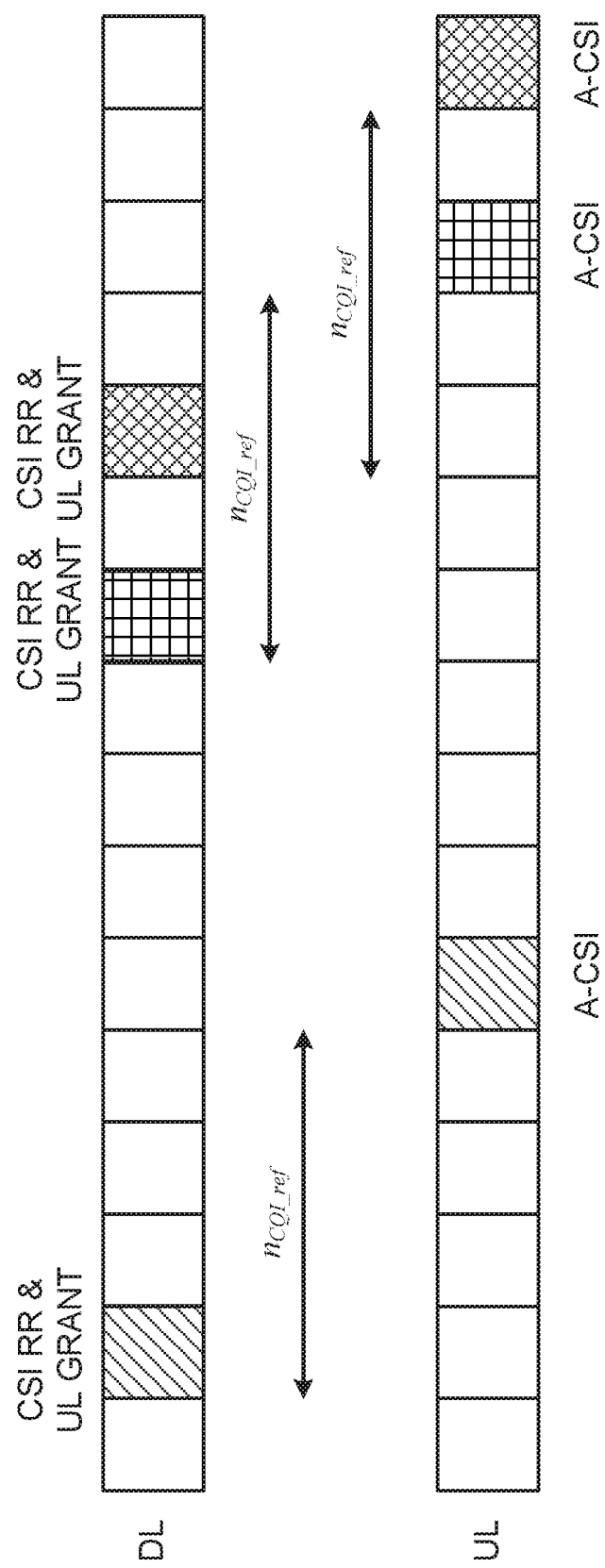
FIG. 6 is a diagram to show examples of CSI reference resources for use for A-CSI reporting in existing systems.

FIG. 6 is a diagram to show examples of CSI reference resources for use for A-CSI reporting in existing systems. In FIG. 6, UE reports A-CSI, in the UL, $n_{CQI\_ref}$ subframes (four subframes in this example) after the subframe in which a UL grant to contain a CSI trigger is received.

Here, the above-described method of determining CSI RRs is based on the behavior of existing LTE systems. It then follows that, when sTTIs and/or processing time reduction are introduced, there is a risk that the use of above-described method of determining CSI RRs may cause problems such as deterioration of communication quality, communication throughput, spectral efficiency and so on.

Therefore, the present inventors have come up with the idea of determining CSI RRs properly when sTTIs and/or shortened processing time are configured. According to one embodiment of the present invention, CSI RRs can be arranged flexibly and measured by UE, so that improvement of overall system throughput can be anticipated.

Now, embodiments of the present invention will be described in detail below with reference to the accompanying drawings. Note that the radio communication method according to each embodiment may be used alone or may be used in combination. Furthermore, the configurations that have been described earlier with reference to FIG. 3, FIG. 4 and/or others can be applied to the sTTI of each embodiment.

Furthermore, although LTE systems will be exemplified in the following description, the present embodiment is not limited to this, and any system that uses sTTIs and/or reduced processing time is applicable. Also, although CSI reporting requests will be described as examples of CSI triggers according to each embodiment below, CSI measurement requests, CSI measurement reporting requests, and/or others may be used as well.

Radio Communication Method

FIRST EMBODIMENT

In the first embodiment of the present invention below, when sTTIs and/or processing time reduction are applied, a conventional method for determining CSI RRs is used.

In the first embodiment, when P-CSI is reported in subframe n, the CSI RR is found in the nearest subframe that is located at least four subframes before the subframe in which the P-CSI is reported and that fulfills predetermined conditions. Therefore, even when sTTIs and/or reduction of processing time are applied, P-CSI reporting can maintain the same behavior as heretofore.

In the first embodiment, when A-CSI is reported in subframe n, different behavior from existing behavior may be demonstrated. The following description will assume that reduction of processing time is applied, and that, as a result of this, when UE receives a UL grant in a subframe, the UE performs the transmission based on this UL grant N subframes (N is a value less than four) after the subframe in which the UE grant is received. In this case, $n_{CQI\_ref}$ is not four or a greater value, but is N. The CSI RR is found in the subframe in which the UL grant, including a CSI trigger, is received, for example.

Figure 7:
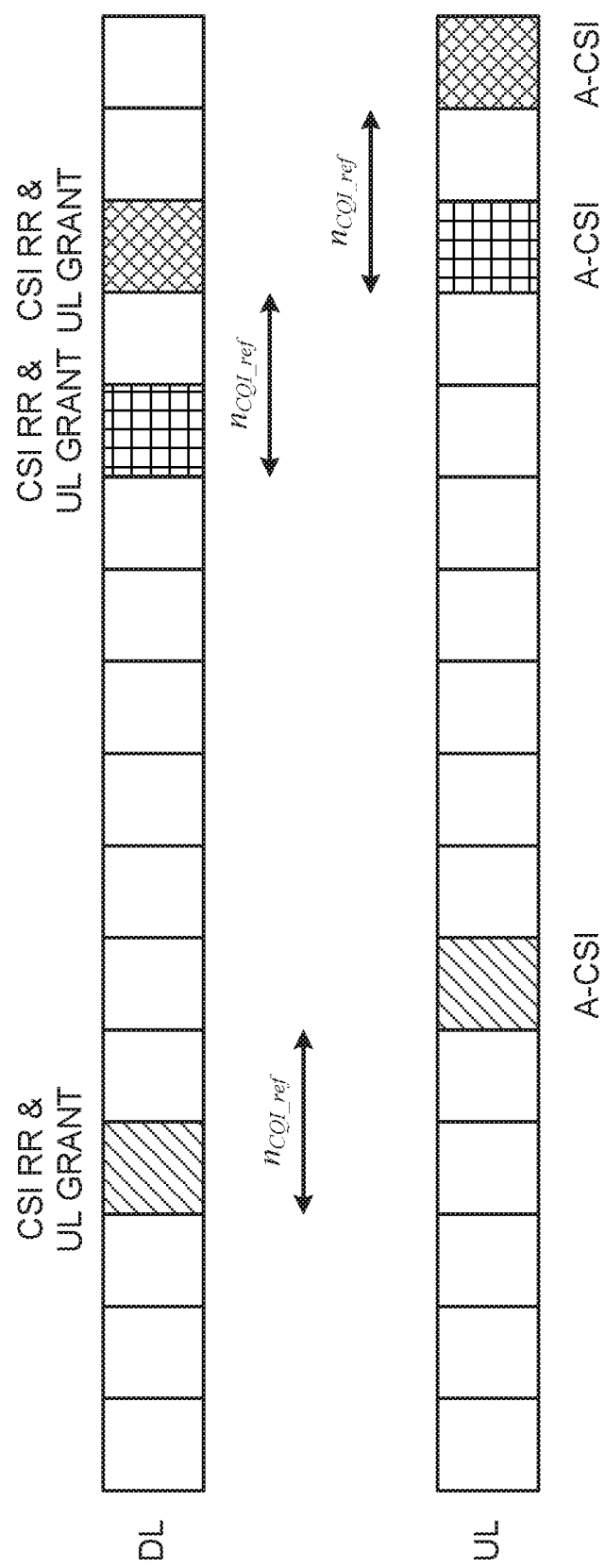
FIG. 7 is a diagram to show examples of CSI reference resources for use for A-CSI reporting according to a first embodiment of the present invention.

FIG. 7 is a diagram to show examples of CSI reference resources for use for A-CSI reporting according to the first embodiment. In this example, N=2. The UE measures CSI using the CSI RR in the subframe in which a UL grant to contain a CSI trigger is received. Then, $n_{CQI\_ref}$ subframes (two subframes in this example) after this subframe, the UE reports A-CSI in the UL.

Figure 8:
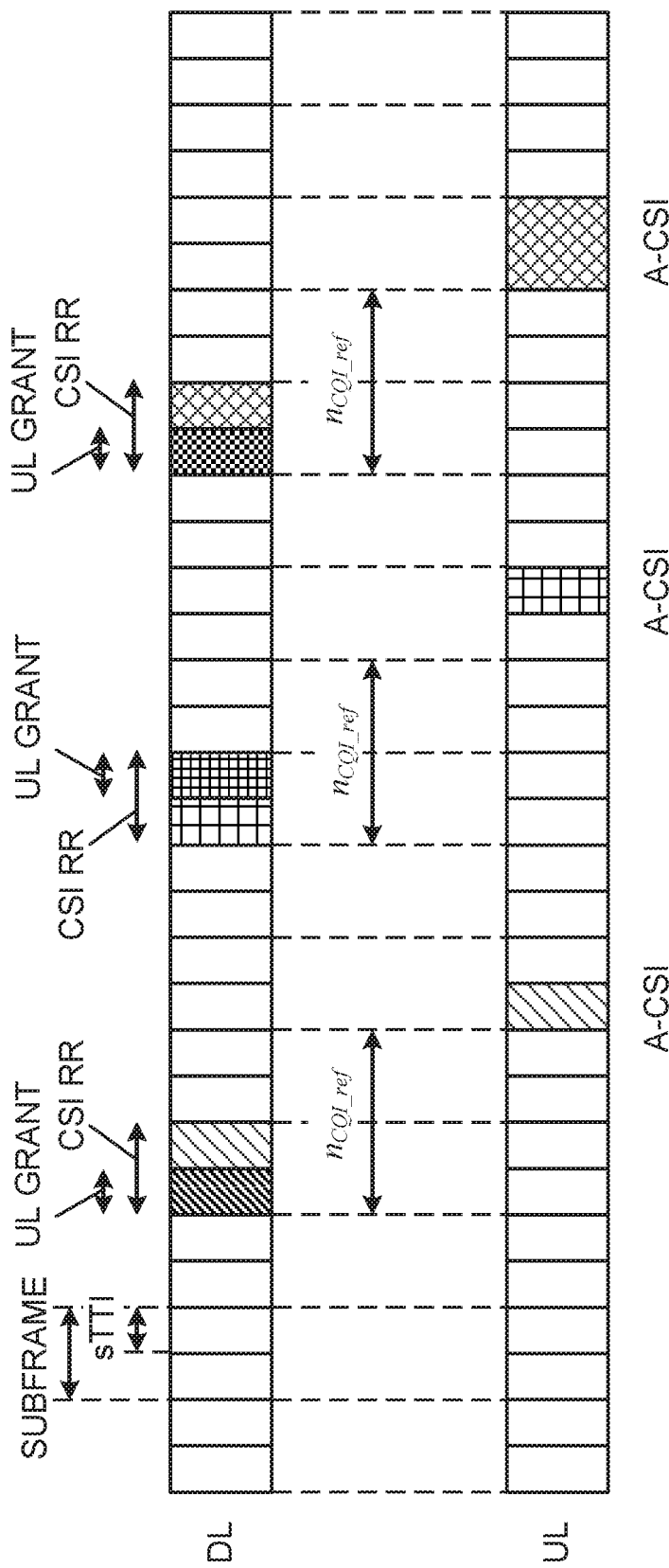
FIG. 8 is a diagram to show other example of CSI reference resources for use for A-CSI reporting according to the first embodiment.

An example of using sTTIs while also applying reduced processing time will be described with reference to FIG. 8. FIG. 8 is a diagram to show other examples of CSI reference resources for use for A-CSI reporting according to the first embodiment. In this example, N=2 as in FIG. 7. Also, in this example, UE is configured to use sTTIs (TTI duration=0.5 ms) in the DL and the UL.

UE monitors for the sPDCCH in each sTTI, and, when the UE detects a UL grant containing a CSI trigger, the UE measures CSI by using the CSI RR in the subframe in which the sTTI where the UL grant is detected is included. As shown in FIG. 8, irrespective of in which location (in which sTTI) in one subframe a UL grant is received, the UE may measure CSI based on this one subframe.

Also, the UE may measure CSI based only on the sTTI where the UL grant is received, or measure CSI by using resources apart from the sTTI in which the UL grant is received in one subframe, as CSI RRs. That is, in the first embodiment, when A-CSI reporting is triggered by a UL grant, the CSI RR may be found in the sTTI in which the UL grant is received, or may be found in an sTTI in which the UL grant is not received, within the subframe the UL grant is received.

Alternatively, the UE may assume that a UL grant to contain a CSI trigger is received only in predetermined sTTIs in one subframe. For example, the UE may assume that a UL grant to contain a CSI trigger is received only in the first sTTI or in an sTTI included in the first slot. This enables sequential processing, such as detecting a UL grant first and then measuring CSI, so that the UE's memory and battery consumption can be reduced.

Also, when a UL grant is detected in an sTTI contained in a given subframe, the UE reports A-CSI in the UL $n_{CQI\_ref}$ subframes later (two subframes in this example). This report of A-CSI may be transmitted in an sTTI (transmitted in an sPUSCH, for example), or may be transmitted in an nTTI (transmitted in a PUSCH, for example).

Note that, when the A-CSI report is transmitted in an sTTI, the A-CSI report may be transmitted in the sTTI just $n_{CQI\_ref}$ subframes after the sTTI in which the UL grant was received. Also, the UE may control the relative position of the sTTI in which the UL grant was received in the subframe and the relative position of the sTTI in which A-CSI is reported in the subframe to be the same.

For example, as shown in FIG. 8, if a UL grant is received in the first (last) sTTI in a subframe, the UE may exert control so that the corresponding A-CSI is reported in the first (last) sTTI that comes $n_{CQI\_ref}$ subframes later. Note that application of such control is not limited to the case where the same sTTI duration is used in the DL and the UL as in FIG. 8.

According to the first embodiment described above, even when sTTIs and/or reduction of processing time are applied, the timing control for P-CSI reporting can be prevented from being changed from existing control, while A-CSI can be reported at an early timing.

SECOND EMBODIMENT

In a second embodiment of the present invention, when sTTIs and/or processing time reduction are applied, a method of determining CSI RRs that is different from existing ones is used.

The second embodiment is the same as conventional art except that the time field for CSI RRs lies in a single downlink subframe or special subframe (the subframe of $n-n_{CQI\_ref}$) that is located a predetermined number ($n_{CQI\_ref}$) of subframes before subframe n in which CSI is reported.

In the Case of P-CSI Reporting

According to the second embodiment, in the event P-CSI is reported in subframe n, $n_{CQI\_ref}$ assumes the minimum value that is greater than or equal to a predetermined value (hereinafter "X") so that the subframe of $n-n_{CQI\_ref}$ corresponds to a valid downlink subframe or special subframe. Here, X has a smaller value than four, but can have a value greater than or equal to four.

X that is used to identify the CSI RR for reporting P-CSI may be configured in UE by using, for example, higher layer signaling (for example, RRC signaling), physical layer signaling (for example, DCI), or a combination of these. Here, information related to the values of X that the UE can support is preferably reported from the UE to the network (such as eNB) in advance by using UE capability information (UE capability), for example. The eNB may determine X to configure for the UE based on this UE capability information and/or other information (for example, the UE's category and/or the like).

Figure 9:
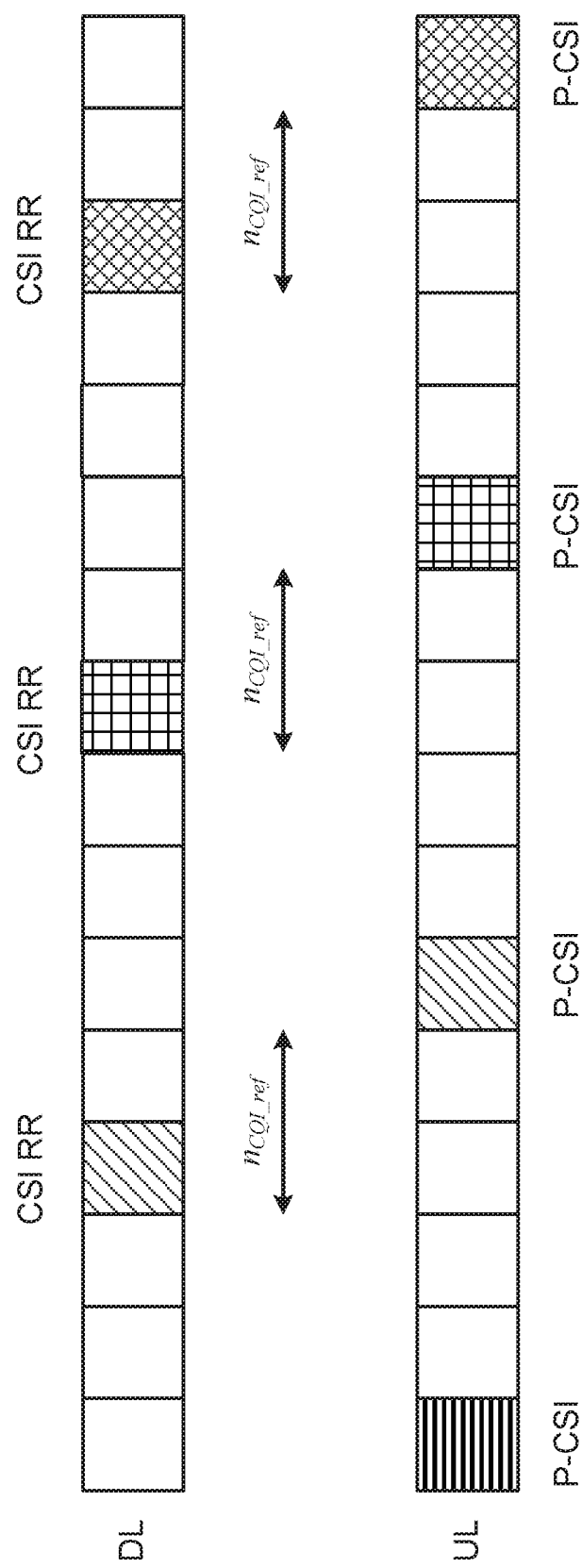
FIG. 9 is a diagram to show examples of CSI reference resources for use for P-CSI reporting according to a second embodiment of the present invention.

FIG. 9 is a diagram to show examples of CSI reference resources for use for P-CSI reporting according to the second embodiment. In this example, X=2 is configured in the UE. In FIG. 9, the UE reports P-CSI in the UL periodically (in this example, every five subframes). In this example, a valid subframe is located $n_{CQI\_ref}$ subframes (two subframes in this example) before the subframe in which P-CSI is reported, and the UE measures CSI using the CSI RR of this valid subframe.

Also, X may be associated with sTTI durations (TTI durations) for use in the DL and/or the UL. In this case, the UE can determine the value of X based on which sTTI configuration is used. For example, the UE may determine the value of X based on whether or not shortened TTIs are configured for the uplink and/or the downlink, or determine the value of X based on what shortened TTIs are configured (for example, what sTTI duration is configured) in the uplink and/or the downlink.

The associations between sTTI durations for use in the DL and/or the UL and the values of X may be set forth in the specification (for example, set forth in a table), or may be configured in the UE by using, for example, higher layer signaling, physical layer signaling, or a combination of these. The above associations may be configured so that X is less than four if sTTIs are configured in at least one of the DL and the UL. Also, the above associations may be configured so that X is greater than or equal to four if both the DL and the UL use nTTIs.

Figure 10:
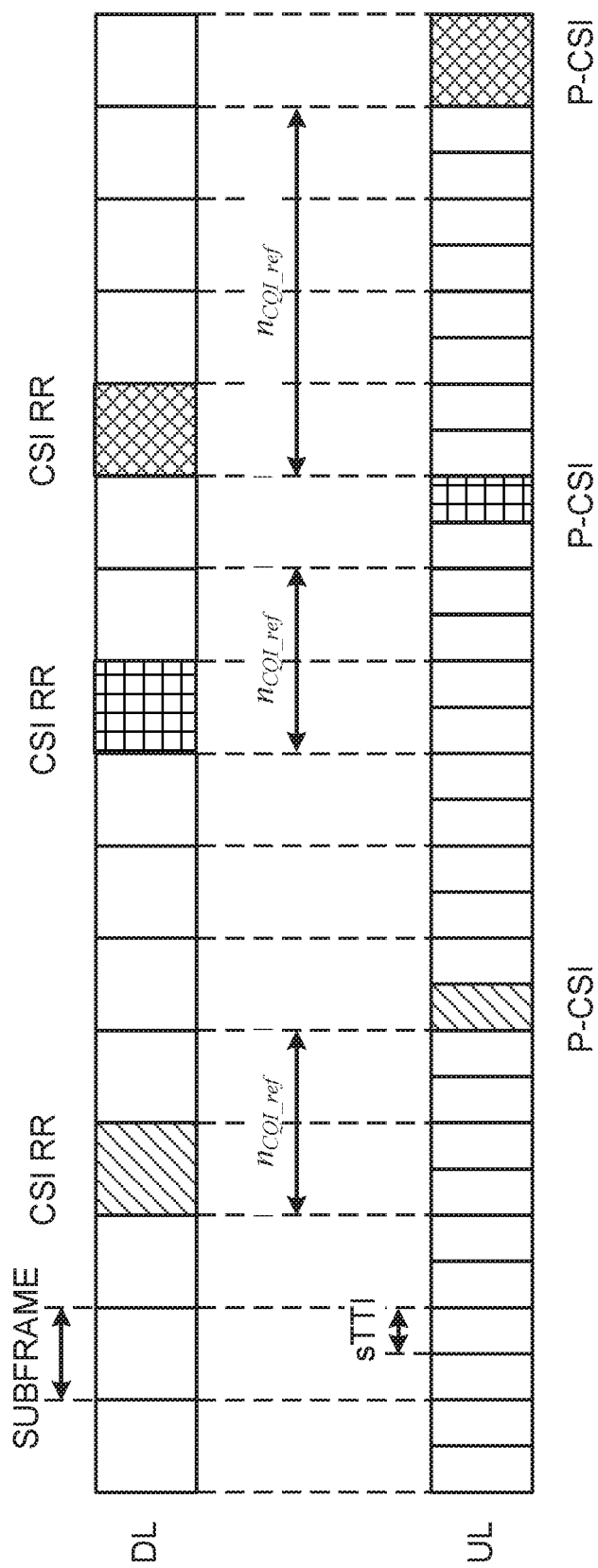
FIG. 10 is a diagram to show other example of CSI reference resources for use for P-CSI reporting according to the second embodiment.

FIG. 10 is a diagram to show other examples of CSI reference resources for use for P-CSI reporting according to the second embodiment. This example is designed so that X is less than four (for example, two) when P-CSI is reported in an sTTI, and X is four when P-CSI is reported in an nTTI. Also, in this example, whether P-CSI is transmitted in an sPUCCH or in a normal PUCCH is configured (reported) to the UE dynamically and/or semi-statically.

In FIG. 10, the UE reports P-CSI in the UL periodically (in this example, every five subframes). Every time the UE reports P-CSI, the UE determines the value of X and $n_{CQI\_ref}$ based on the duration of the TTI used for the report, and measures CSI in appropriate CSI RRs. Note that, when P-CSI is transmitted in an sTTI (sPUCCH), the P-CSI may be transmitted in an arbitrary sTTI within the subframe in which the P-CSI is reported, or may be transmitted in a predetermined sTTI that is defined in the specification or configured.

Note that the value of above X may be determined in other ways. For example, the UE may determine the value of X based on whether or not shortened processing time is configured in the UL and/or the DL, or determine the value of X based on the combination of the shortened TTIs and the shortened processing time that are configured.

In the Case of A-CSI Reporting

According to the second embodiment, in the event A-CSI is reported in subframe n in response to a trigger contained in a UL grant, $n_{CQI\_ref}$ assumes a predetermined value (hereinafter "Y"), and the subframe of $n-n_{CQI\_ref}$ may correspond to a valid downlink subframe or special subframe. Here, Y has a smaller value than four, but can have a value greater than or equal to four. The value of Y may be the same as or different from the value of X described above.

Furthermore, the subframe of the $n-n_{CQI\_ref}$ may be the same subframe as the subframe in which the UL grant is received, or may be a different subframe. That is, the CSI RR may be found in a subframe before and/or after the subframe in which a CSI trigger (UL grant) corresponding to A-CSI is received.

Figure 11:
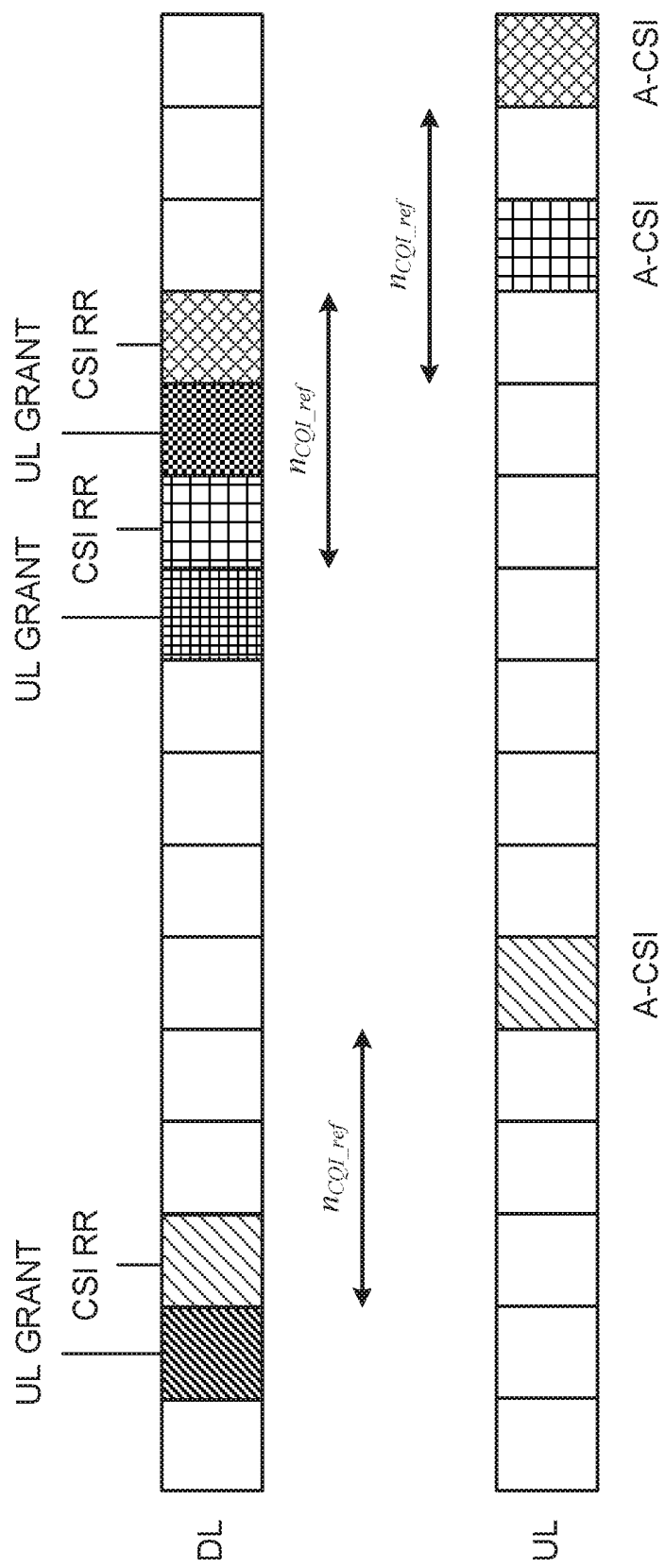
FIG. 11 is a diagram to show examples of CSI reference resources for use for A-CSI reporting according to the second embodiment.

FIG. 11 is a diagram to show examples of CSI reference resources for use for A-CSI reporting according to the second embodiment. In this example, CSI is measured using subframes after the subframe in which a UL grant is received. In this example, Y is a value less than or equal to three. When UE receives a UL grant containing a CSI trigger, the UE identifies the subframe of $n-n_{CQI\_ref}$ based on Y.

Although FIG. 11 shows an example in which no sTTI is configured, even if sTTIs are used, the subframe of $n-n_{CQI\_ref}$ can be identified likewise. Furthermore, in FIG.

11, transmission based on a UL grant is executed four subframes after the subframe in which the UL grant is received, but this is by no means limiting.

As shown in FIG. 11, when a configuration is employed in which CSI RR-based measurements are conducted after a UL grant is received, a long period of time can be reserved after a UL grant is received, up until data, including A-CSI, is transmitted, so that the load on the UE related to encoding and/or other processes can be distributed over time, and reduced. Also, the time from CSI measurements to CSI reporting is shortened, so that CSI can be measured more accurately.

Figure 12:
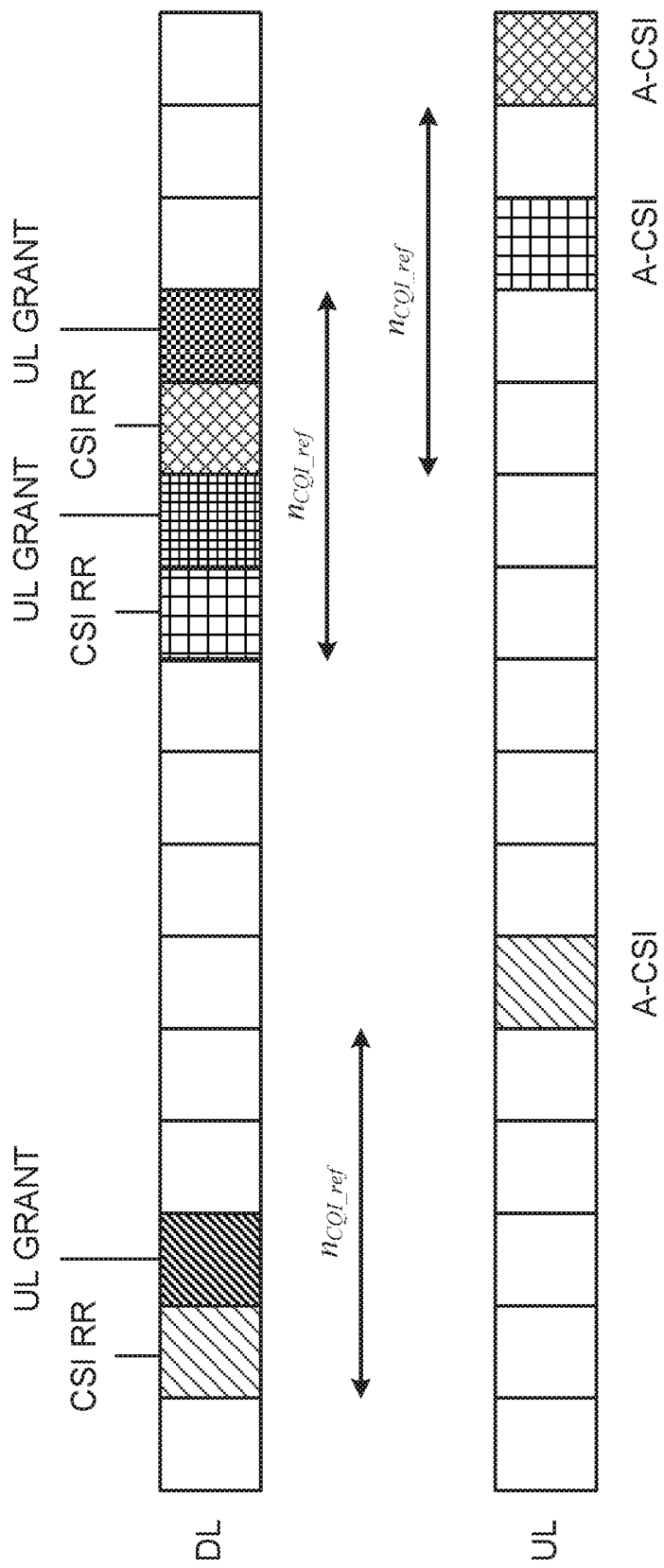
FIG. 12 is a diagram to show other examples of CSI reference resources for use for A-CSI reporting according to the second embodiment.

FIG. 12 is a diagram to show other examples of CSI reference resources for use for A-CSI reporting according to the second embodiment. In this example, CSI is measured in subframes before the subframe in which a UL grant is received. In this example, Y is a value less than or equal to four. The UE performs CSI measurements, on a per subframe basis, assuming CSI RRs. Furthermore, upon receiving a UL grant containing a CSI trigger, the UE identifies the subframe of $n-n_{CQI\_ref}$ based on Y, and transmits A-CSI in subframe n.

Although FIG. 12 shows an example where no sTTI is configured, even if sTTIs are used, the subframe of n-nCQI can be identified likewise. Furthermore, in FIG. 12, transmission based on a UL grant is executed three subframes after the subframe in which the UL grant is received, but this is by no means limiting.

As shown in FIG. 12, when a configuration is employed in which CSI RR-based measurements are conducted before a UL grant is received, a CSI report that is generated by using CSI measured in advance can be fed back in response to a UL grant in a short time. Consequently, this configuration is preferable when the size of the CSI to be fed back is large and/or the size of the data specified by a UL grant is small.

Note that at least one of information representing the positional relationship (for example, relative positional relationship (forward, same, backward, etc.)) between the CSI RR corresponding to a UL grant containing a CSI trigger, and the subframe in which the UL grant is received, and information as to whether the CSI RR is found in the subframe in which the UL grant containing the CSI trigger is received, and/or other pieces of information may be reported, (configured, commanded, etc.) from eNB to UE by using higher layer signaling (for example, RRC signaling), physical layer signaling (for example, DCI), or a combination of these.

Note that, even when a CSI trigger is received in a random access response grant, a method of determining CSI RRs, such as those described above with reference to FIG. 11 and FIG. 12, may be used.

Even when neither sTTIs nor processing time reduction is applied, the above-described configuration to measure CSI for A-CSI in different subframes from the subframe in which a UL grant containing a CSI rigger is received can be used.

According to the second embodiment described above, even when sTTIs and/or reduction of processing time are applied, UE can still adequately determine the CSI RRs for use for P-CSI reporting and/or A-CSI reporting and control signal processing.

Note that, in each embodiment described above, CSI RRs are found in subframes that are located a period before the subframe in which CSI is reported, where the period is shorter than four subframes (4 ms), but application of the present invention is not limited to this. For example, more generally, CSI RRs may be found in subframes that are located a period, which is then shorter than a predetermined period of time, before the subframe in which CSI is reported. The predetermined period of time can assume any value such as 3 ms, 4 ms, 5 ms, etc. Furthermore, "shorter than a predetermined period of time" here may be paraphrased with at least one of "shorter than a predetermined period of time," "the same as a predetermined period of time," and "longer than a predetermined period of time."

Radio Communication System

Now, the structure of the radio communication system according to one embodiment of the present invention will be described below. In this radio communication system, communication is performed using one or a combination of the radio communication methods according to the herein-contained embodiments of the present invention.

Figure 13:
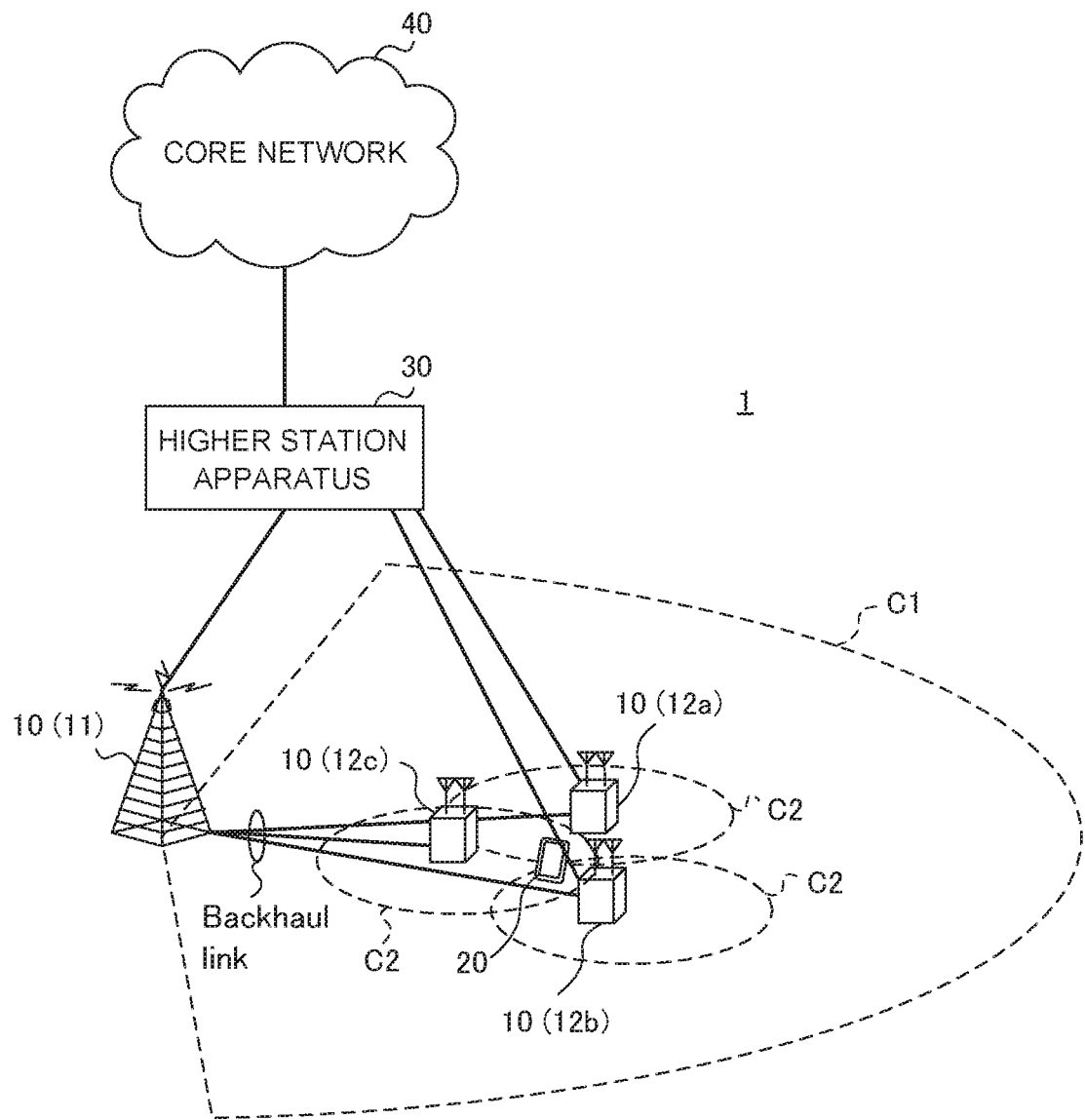
FIG. 13 is a diagram to show an example of a schematic structure of a radio communication system according to one embodiment of the present invention.

FIG. 13 is a diagram to show an example of a schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "FRA (Future Radio Access)," "New-RAT (Radio Access Technology)" and so on, or may be seen as a system to implement these.

The radio communication system 1 includes a radio base station 11 that forms a macro cell C1, and radio base stations 12a to 12c that are placed within the macro cell C1 and that form small cells C2, which are narrower than the macro cell C1. Also, user terminals 20 are placed in the macro cell C1 and in each small cell C2.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmission/reception points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) is applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that uplink and downlink radio access schemes are not limited to the combination of these, and other radio access schemes may be used.

In the radio communication system 1, a downlink shared channel (PDSCH (Physical Downlink Shared CHannel)), which is used by each user terminal 20 on a shared basis, a broadcast channel (PBCH (Physical Broadcast CHannel)), downlink L1/L2 control channels and so on are used as downlink channels. User data, higher layer control information and SIBs (System Information Blocks) are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PDSCH scheduling information, is communicated by the PDCCH. The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACKs," "ACK/NACKs," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared CHannel)), which is used by each user terminal 20 on a shared basis, an uplink control channel (PUCCH (Physical Uplink Control CHannel)), a random access channel (PRACH (Physical Random Access CHannel)) and so on are used as uplink channels. User data and higher layer control information are communicated by the PUSCH. Also, downlink radio quality information (CQI (Channel Quality Indicator)), delivery acknowledgement information and so on are communicated by the PUCCH. By means of the PRACH, random access preambles for establishing connections with cells are communicated.

In the radio communication system 1, cell-specific reference signals (CRSs), channel state information reference signals (CSI-RSs), demodulation reference signals (DMRSs), positioning reference signals (PRSs) and so on are communicated as downlink reference signals. Also, in the radio communication system 1, measurement reference signals (SRSs (Sounding Reference Signals)), demodulation reference signals (DMRSs) and so on are communicated as uplink reference signals. Note that the DMRSs may be referred to as "user terminal-specific reference signals (UE-specific reference signals)." Also, the reference signals to be communicated are by no means limited to these.

Radio Base Station

Figure 14:
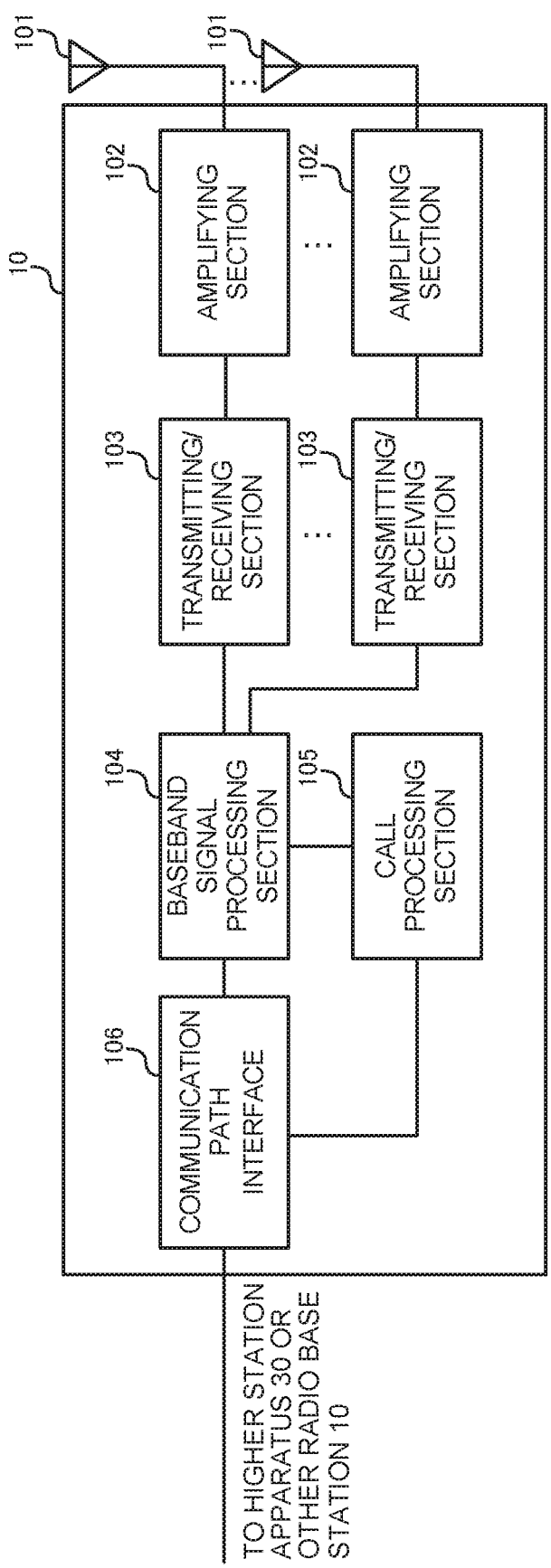
FIG. 14 is a diagram to show an example of an overall structure of a radio base station according to one embodiment of the present invention.

FIG. 14 is a diagram to show an example of an overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to the transmitting/receiving sections 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

The transmitting/receiving sections 103 transmit the PDSCH, the sPDSCH and so on, to the user terminal 20. The transmitting/receiving sections 103 receive the PUCCH, the sPUCCH and so on, from the user terminal 20.

Furthermore, the transmitting/receiving sections 103 may transmit information related to CSI RRs, information related to X and/or Y, which are used to specify CSI RRs, and information about the positional relationship between the CSI RR corresponding to a UL grant containing a CSI trigger, and the subframe in which this UL grant is transmitted, and/or other pieces of information, to the user terminal 20.

Figure 15:
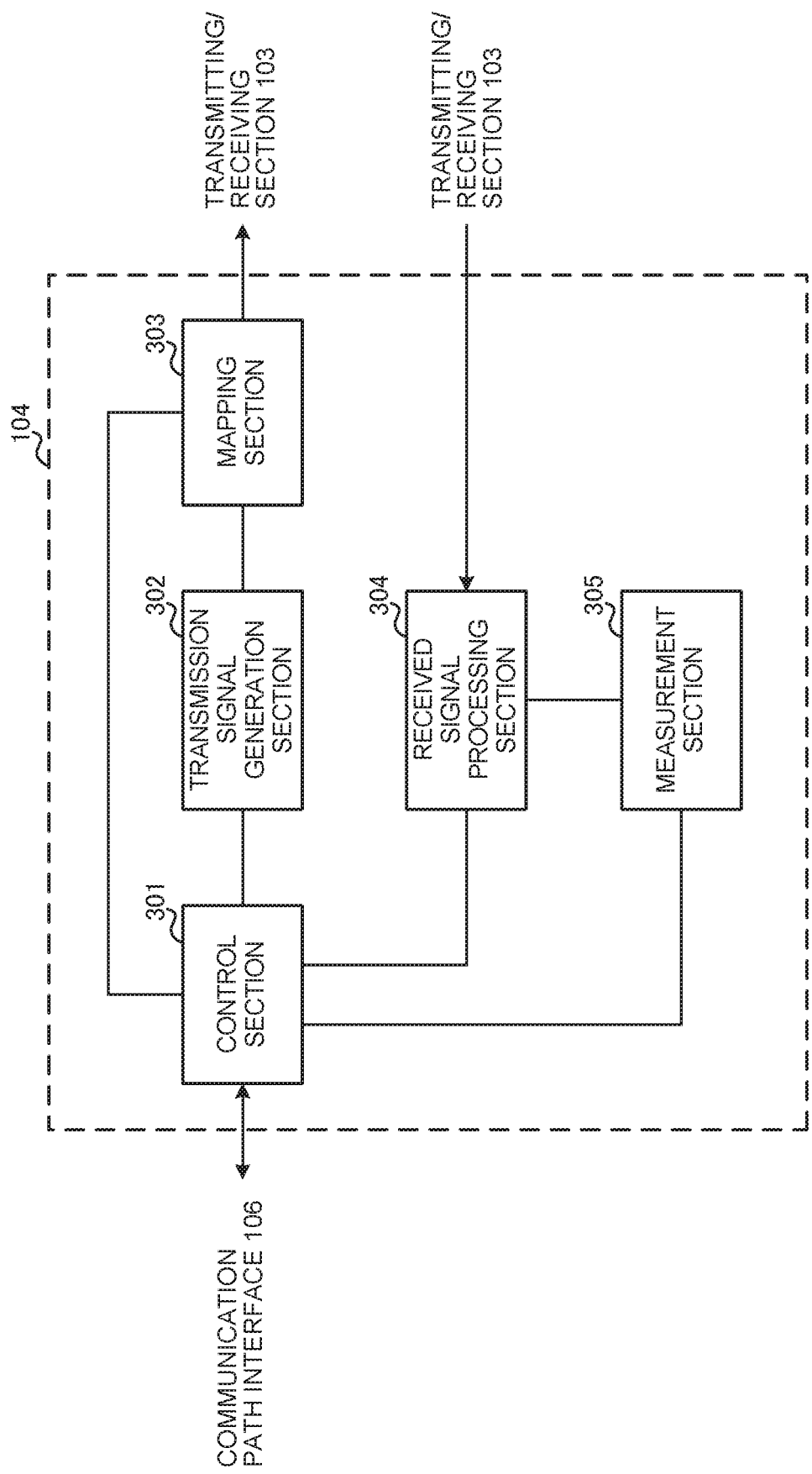
FIG. 15 is a diagram to show an example of a functional structure of a radio base station according to one embodiment of the present invention.

FIG. 15 is a diagram to show an example of a functional structure of a radio base station according to one embodiment of the present invention. Note that, although this example primarily shows functional blocks that pertain to characteristic parts of the present embodiment, the radio base station 10 has other functional blocks that are necessary for radio communication as well.

The baseband signal processing section 104 has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301, for example, controls the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of downlink data signals that are transmitted in the PDSCH and downlink control signals that are communicated in the PDCCH and/or the EPDCCH. The control section 301 controls the generation of downlink control signals (for example, delivery acknowledgement information and so on) and downlink data signals, based on the results of deciding whether or not retransmission control is necessary for uplink data signals, and so on. Also, the control section 301 controls the scheduling of downlink reference signals such as synchronization signals (for example, the PSS (Primary Synchronization Signal)/SSS (Secondary Synchronization Signal)), the CRS, the CSI-RS, the DM-RS and so on.

In addition, the control section 301 controls the scheduling of uplink data signals that are transmitted in the PUSCH, uplink control signals that are transmitted in the PUCCH and/or the PUSCH (for example, delivery acknowledgment information), random access preambles that are transmitted in the PRACH, uplink reference signals, and so on.

When UCI received from the user terminal 20 is acquired via the received signal processing section 304, the control section 301 performs data retransmission control and scheduling control on the user terminal 20 based on the UCI. For example, when HARQ-ACK is acquired from the received signal processing section 304, the control section 301 determines whether retransmission to the user terminal 20 is necessary or not, and exerts control so that retransmission processing is performed when retransmission is necessary.

The control section 301 may exert control so that communication is performed in cells (CCs) using sTTIs having a shorter TTI duration than 1 ms (subframes in existing LTE systems), or exert control so that communication is performed in cells where communication is controlled by applying shortened processing time, which is shorter than that in existing LTE systems. For example, the control section 301 may configure the user terminal 20 to communicate based on sTTIs and/or shortened processing time.

In addition, the control section 301 controls the user terminal 20 to measure CSI using a CSI RR in at least one of these cells. For example, the control section 301 transmits signals for measuring CSI, such as CRS, CSI-RS and/or others, in a CSI RR. Furthermore, the control section 301 exerts control so that measured CSI is received in a predetermined subframe (subframe and/or sTTI).

Note that the above CSI RR is found in a subframe that is located a period before a predetermined subframe in which CSI is transmitted, where the period is shorter than a predetermined period of time (for example, 4 ms). For example, the CSI RR may be found in a subframe that is located a period before a predetermined subframe in which CSI is transmitted, and in which a CSI trigger is transmitted, where the period is shorter than a predetermined period of time, or the CSI RR may be found in a subframe that is different from the subframe in which the CSI trigger is transmitted.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink signal allocation information, and UL grants, which report uplink signal allocation information, based on commands from the control section 301. Also, the downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminal 20 (uplink control signals, uplink data signals, uplink reference signals, etc.). For the received signal processing section 304, a signal processor, a signal processing circuit or signal processing apparatus that can be described based on general understanding of the technical field to which the present invention pertains can be used.

The received signal processing section 304 outputs the decoded information, acquired through the receiving processes, to the control section 301. For example, when a PUCCH to contain an HARQ-ACK is received, the received signal processing section 304 outputs this HARQ-ACK to the control section 301. Also, the received signal processing section 304 outputs the received signals, the signals after the receiving processes and so on, to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

When signals are received, the measurement section 305 may measure, for example, the received power (for example, RSRP (Reference Signal Received Power)), the received quality (for example, RSRQ (Reference Signal Received Quality)), SINR (Signal to Interference plus Noise Ratio) and/or the like), channel states and so on. The measurement results may be output to the control section 301.

User Terminal

Figure 16:
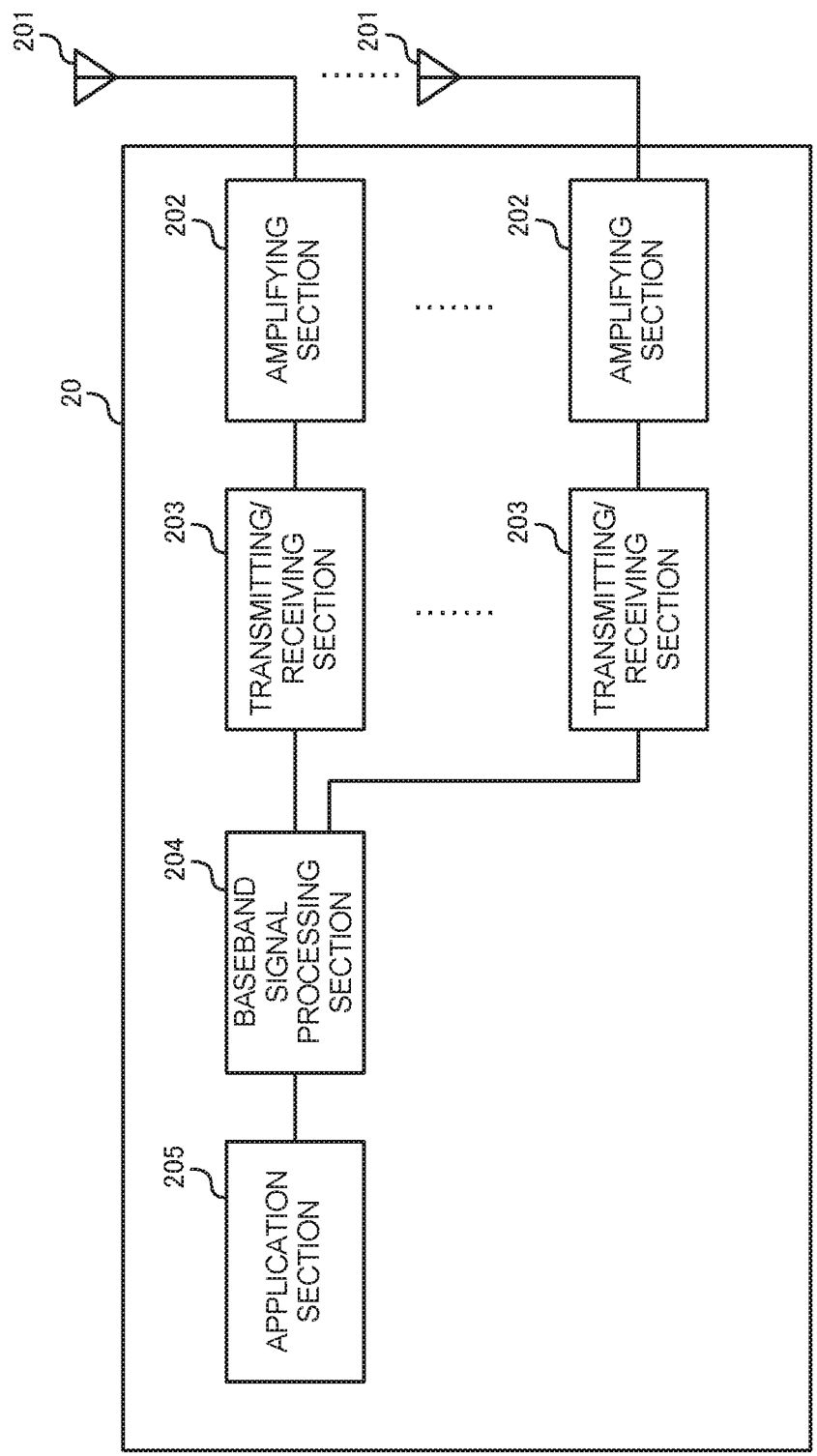
FIG. 16 is a diagram to show an example of an overall structure of a user terminal according to one embodiment of the present invention.

FIG. 16 is a diagram to show an example of an overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

The transmitting/receiving sections 203 receive the PDSCH, the sPDSCH and so on, from radio base station 10. The transmitting/receiving sections 203 transmit the PUCCH, the sPUCCH and so on, to the radio base station 10.

Furthermore, the transmitting/receiving sections 203 may transmit, from the radio base station 10, information related to CSI RRs, information related to X and/or Y, which are used to specify CSI RRs, and information about the positional relationship between the CSI RR corresponding to a UL grant containing a CSI trigger, and the subframe in which this UL grant is transmitted, and/or other pieces of information.

Figure 17:
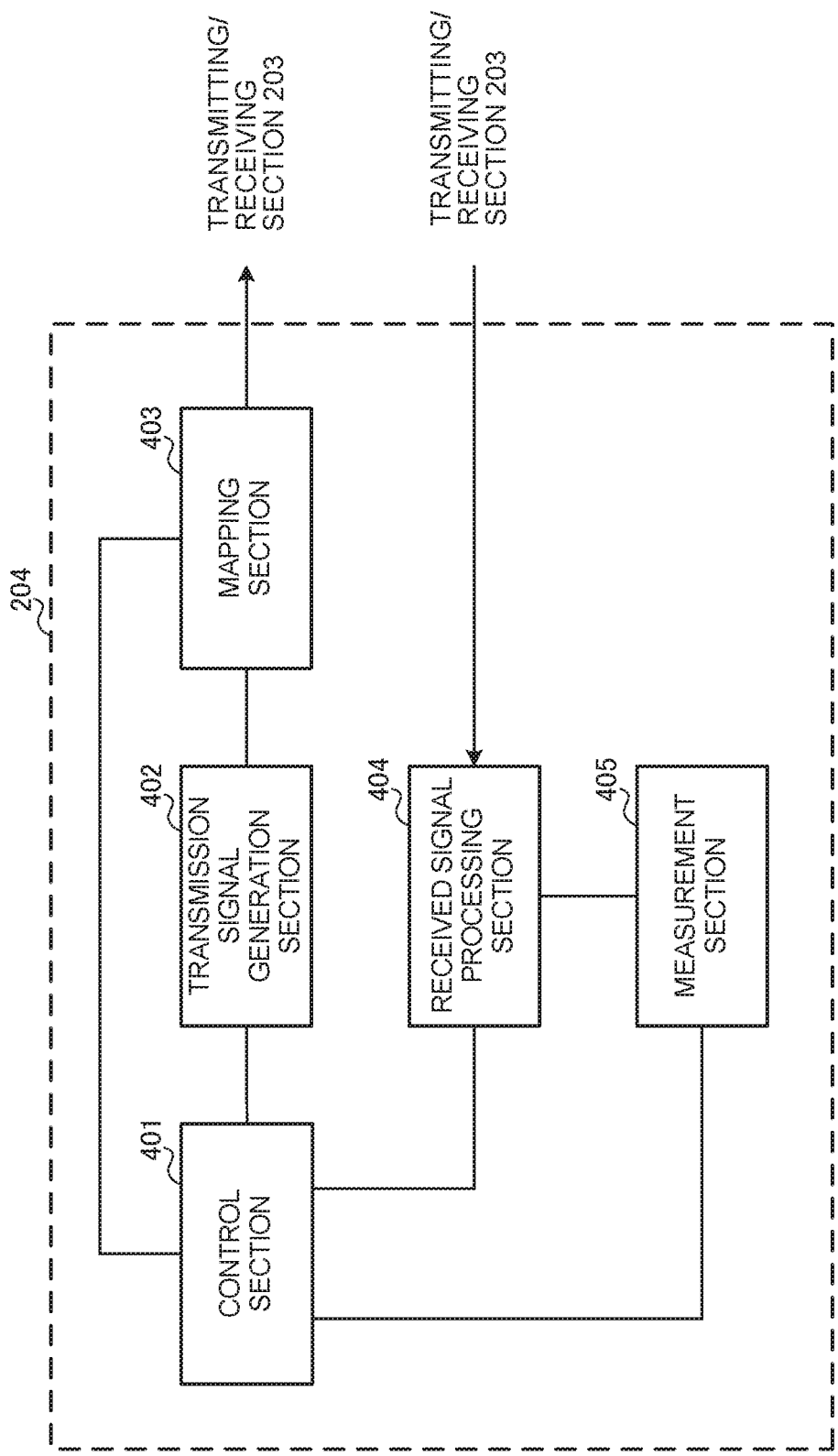
FIG. 17 is a diagram to show an example of a functional structure of a user terminal according to one embodiment of the present invention.

FIG. 17 is a diagram to show an example of a functional structure of a user terminal according to one embodiment of the present invention. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals by the mapping section 403, and so on. Furthermore, the control section 401 controls the signal receiving processes in the received signal processing section 404, the measurements of signals in the measurement section 405, and so on.

The control section 401 acquires the downlink control signals (signals transmitted in the PDCCH/EPDCCH) and downlink data signals (signals transmitted in the PDSCH) transmitted from the radio base station 10, via the received signal processing section 404. The control section 401 controls the generation of uplink control signals (for example, delivery acknowledgement information and so on) and/or uplink data signals based on the results of deciding whether or not retransmission control is necessary for the downlink control signals and/or downlink data signals, and so on.

The control section 401 may exert control so that communication is performed in cells (CCs) using sTTIs having a shorter TTI duration than 1 ms (existing subframes), or exert control so that communication is performed in cells where communication is controlled by applying shortened processing time that is shorter than in existing LTE systems. The control section 401 controls the measurement section 405 and/or others to measure CSI based on CSI RRs in at least one of these cells. Furthermore, the control section 401 exerts control so that measured CSI is transmitted in a predetermined subframe (subframe and/or sTTI).

Note that the CSI RR is found in a subframe that is located a period before a predetermined subframe in which CSI is transmitted, where the period is shorter than a predetermined period of time (for example, 4 ms). For example, the CSI RR may be found in a subframe that is located a period before a predetermined subframe in which CSI is transmitted, and in which a CSI trigger is received, where the period is shorter than a predetermined period of time, or the CSI RR may be found in a subframe that is different from the subframe in which the CSI trigger is received.

In addition, the control section 401 may control the measurement section 405 to determine the period shorter than a predetermined period of time. For example, when the transmission section 203 transmits CSI periodically, the control section 401 may control the measurement section 405 to determine the period shorter than a predetermined period of time, based on a predetermined value that is configured, or based on whether or not shortened TTIs are configured in the UL and/or the DL.

In addition, when various pieces of information reported from the radio base station 10 are acquired from the received signal processing section 404, the control section 401 may update the parameters used for control based on the information.

The transmission signal generation section 402 generates uplink signals (uplink control signals, uplink data signals, uplink reference signals, etc.) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission signal generation section 402 generates uplink control signals related to delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and outputs the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information, acquired through the receiving processes, to the control section 401. The received signal processing section 404 outputs, for example, broadcast information, system information, RRC signaling, DCI and so on, to the control section 401. Also, the received signal processing section 404 outputs the received signals, the signals after the receiving processes and so on, to the measurement section 405.

The measurement section 405 conducts measurements with respect to the received signals. For example, the measurement section 405 performs measurements using CRS, CSI-RS and/or others transmitted from the radio base station 10. For example, the measurement section 405 can judge in which TTIs, sTTIs and/or others CSI-RRs are contained, and measure CSI using these CSI RRs. The measurement section 405 can be constituted by a measurer, a measurement circuit or measurement apparatus that can be described based on general understanding of the technical field to which the present invention pertains.

The measurement section 405 may measure, for example, the received power (for example, RSRP), the received quality (for example, RSRQ, received SINR), the channel states and so on of the received signals. The measurement results may be output to the control section 401.

Hardware Structure

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 18:
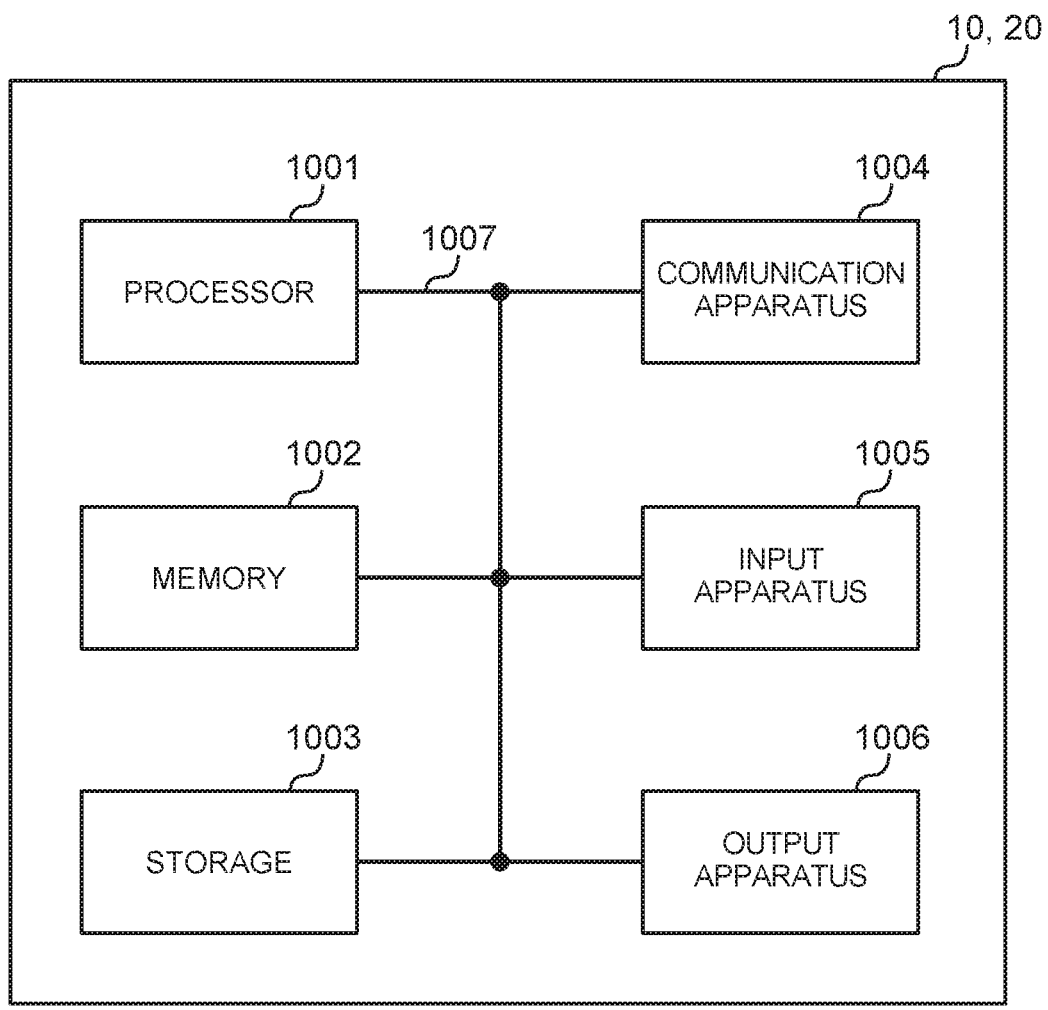
FIG. 18 is a diagram to show an example hardware structure of a radio base station and a user terminal according to one embodiment of the present invention.

For example, the radio base station, user terminals and so on according to embodiments of the present invention may function as a computer that executes the processes of the radio communication method of the present invention. FIG. 18 is a diagram to show an example hardware structure of a radio base station and a user terminal according to one embodiment of the present invention. Physically, the above-described radio base stations 10 and user terminals 20 may be formed as computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawing, or may be designed not to include part of the apparatus.

For example, although only one processor 1001 is shown, a plurality of processors may be provided. Furthermore, processes may be implemented with one processor, or processes may be implemented in sequence, or in different manners, on two or more processors. Note that the processor 1001 may be implemented with one or more chips.

Each function of the radio base station 10 and the user terminal 20 is implemented by allowing predetermined software (programs) to be read on hardware such as the processor 1001 and the memory 1002, and by allowing the processor 1001 to do calculations, the communication apparatus 1004 to communicate, and the memory 1002 and the storage 1003 to read and/or write data.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and others may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory (primary storage apparatus)" and so on. The memory 1002 can store executable programs (program codes), software modules and/or so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these types of apparatus, including the processor 1001, the memory 1002 and others, are connected by a bus 1007 for communicating information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

Variations

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. Furthermore, a slot may be comprised of one or more symbols in the time domain (OFDM (Orthogonal Frequency Division Multiplexing) symbols, SC-FDMA (Single Carrier Frequency Division Multiple Access) symbols, and so on).

A radio frame, a subframe, a slot and a symbol all represent the time unit in signal communication. A radio frame, a subframe, a slot and a symbol may be each called by other applicable names. For example, one subframe may be referred to as a "transmission time interval (TTI)," or a plurality of consecutive subframes may be referred to as a "TTI," and one slot may be referred to as a "TTI." That is, a subframe and a TTI may be a subframe (1 ms) in existing LTE, may be a shorter period than 1 ms (for example, one to thirteen symbols), or may be a longer period of time than 1 ms.

Here, a TTI refers to the minimum time unit of scheduling in radio communication, for example. For example, in LTE systems, a radio base station schedules the allocation of radio resources (such as the frequency bandwidth and transmission power that can be used by each user terminal) for each user terminal in TTI units. Note that the definition of TTIs is not limited to this. The TTI may be the transmission time unit of channel-encoded data packets (transport blocks), or may be the unit of processing in scheduling, link adaptation and so on.

A TTI having a time duration of 1 ms may be referred to as a "normal TTI (TTI in LTE Rel. 8 to 12)," a "long TTI," a "normal subframe," a "long subframe," and so on. A TTI that is shorter than a normal TTI may be referred to as a "shortened TTI," a "short TTI," a "shortened subframe," a "short subframe," and so on.

A resource block (RB) is the unit of resource allocation in the time domain and the frequency domain, and may include one or a plurality of consecutive subcarriers in the frequency domain. Also, an RB may include one or more symbols in the time domain, and may be one slot, one subframe or one TTI in length. One TTI and one subframe each may be comprised of one or more resource blocks. Note that an RB may be referred to as a "physical resource block (PRB (Physical RB))," a "PRB pair," an "RB pair," or the like.

Furthermore, a resource block may be comprised of one or more resource elements (REs). For example, one RE may be a radio resource field of one subcarrier and one symbol.

Note that the above-described structures of radio frames, subframes, slots, symbols and so on are merely examples. For example, configurations such as the number of subframes included in a radio frame, the number of slots included in a subframe, the number of symbols and RBs included in a slot, the number of subcarriers included in an RB, the number of symbols in a TTI, the symbol duration and the cyclic prefix (CP) duration can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control Channel), PDCCH (Physical Downlink Control Channel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and output via a plurality of network nodes.

The information, signals and so on that are input and/or output may be stored in a specific location (for example, a memory), or may be managed using a management table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base station may, in some cases, be performed by upper nodes. In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The examples/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate systems and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used herein only for convenience, as a method of distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. For example, "connection" may be interpreted as "access. As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave regions and optical (both visible and invisible) regions.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2016-146464, filed on Jul. 26, 2016, including the specification, drawings and abstract, is incorporated herein by reference in its entirety.

The invention claimed is:

1. A terminal comprising:
a transmitter that transmits, to a base station, information related to values that the terminal supports by using terminal capability information;
a receiver that receives, from the base station, configuration information for a value, among the values, to be configured in the terminal; and
a processor that controls to measure Channel State Information (CSI) based on a CSI reference resource in a slot $n-n_{CQI\_ref}$, where n corresponds to a slot in which the CSI is reported and $n_{CQI\_ref}$ corresponds to a smallest value greater than or equal to the value indicated by the configuration information so that the slot $n-n_{CQI\_ref}$ corresponds to a valid downlink slot,
wherein the transmitter transmits the CSI in the slot in which the CSI is reported.

2. A radio communication method for a terminal, comprising:
transmitting, to a base station, information related to values that the terminal supports by using terminal capability information;
receiving, from the base station, configuration information for a value, among the values, to be configured in the terminal;
controlling to measure Channel State Information (CSI) based on a CSI reference resource in a slot $n-n_{CQI\_ref}$ where n corresponds to a slot in which the CSI is reported and $nc_{CQI\_ref}$ corresponds to a smallest value greater than or equal to the value indicated by the configuration information so that the slot $n-n_{CQI\_ref}$ corresponds to a valid downlink slot; and
transmitting the CSI in the slot in which the CSI is reported.

3. A base station comprising:
a receiver that receives, from a terminal, information related to values that the terminal supports by using terminal capability information; and
a transmitter that transmits, to the terminal, configuration information for a value, among the values, to be configured in the terminal,
wherein the transmitter transmits a Channel State Information-Reference Signal (CSI-RS) so that a terminal can measure CSI based on a CSI reference resource in a slot $n-n_{CQI\_ref}$, where n corresponds to a slot in which the CSI is reported and $nc_{CQI\_ref}$ corresponds to a smallest value greater than or equal to the value indicated by the configuration information so that the slot $n-n_{CQI\_ref}$ corresponds to a valid downlink slot, and
wherein the receiver receives the CSI in the slot in which the CSI is reported.

4. A system comprising a terminal and a base station, wherein
the terminal comprises:
a first transmitter that transmits, to the base station, information related to values that the terminal supports by using terminal capability information;
a first receiver that receives, from the base station, configuration information for a value, among the values, to be configured in the terminal; and
a processor that controls to measure Channel State Information (CSI) based on a CSI reference resource in a slot $n-n_{CQI\_ref}$, where n corresponds to a slot in which the CSI is reported and $n_{CQI\_ref}$ corresponds to a smallest value greater than or equal to the value indicated by the configuration information so that the slot $n-n_{CQI\_ref}$ corresponds to a valid downlink slot,
wherein the first transmitter transmits the CSI in the slot in which the CSI is reported, and
the base station comprises:
a second transmitter that transmits a Channel State Information-Reference Signal (CSI-RS) so that the terminal can measure the CSI based on the CSI reference resource in the slot $n-n_{CQI\_ref}$; and
a second receiver that receives the CSI in the slot in which the CSI is reported.

* * * * *